(12) United States Patent
Haider et al.

(10) Patent No.: US 10,467,337 B2
(45) Date of Patent: Nov. 5, 2019

(54) RESPONSIVE DATA EXPLORATION ON SMALL SCREEN DEVICES

(71) Applicant: Kinaxis Inc., Ottawa (CA)

(72) Inventors: Syed Ali Haider, Orleans (CA);
Christopher David Burt, Kanata (CA);
Matthew S. Chmiel, Orleans (CA);
David Dewar, Manotick (CA); Ryan Christopher McCluskey, Orleans (CA)

(73) Assignee: Kinaxis Inc., Kanata (CA)

( * ) Notice: Subject to any disclaimer, the term of this patent is extended or adjusted under 35 U.S.C. 154(b) by 601 days.

(21) Appl. No.: 14/924,149

(22) Filed: Oct. 27, 2015

(65) Prior Publication Data

US 2016/0117308 A1   Apr. 28, 2016

Related U.S. Application Data

(60) Provisional application No. 62/068,975, filed on Oct. 27, 2014, provisional application No. 62/069,019, filed on Oct. 27, 2014.

(51) Int. Cl.
| G06F 17/20 | (2006.01) |
| G06F 17/24 | (2006.01) |
| G06F 3/00  | (2006.01) |
| G06F 17/21 | (2006.01) |

(52) U.S. Cl.
CPC ............. *G06F 17/246* (2013.01); *G06F 3/00* (2013.01); *G06F 17/212* (2013.01)

(58) Field of Classification Search
CPC ...................................................... G06F 3/00
See application file for complete search history.

(56) References Cited

U.S. PATENT DOCUMENTS

| 2003/0067485 | A1 | 4/2003 | Wong et al. |
| 2003/0236917 | A1 | 12/2003 | Gibbs et al. |
| 2005/0094207 | A1 | 5/2005 | Lo et al. |
| 2005/0273695 | A1* | 12/2005 | Schnurr .............. H04W 24/00 715/213 |
| 2007/0079236 | A1* | 4/2007 | Schrier ................ G06F 17/217 715/206 |

(Continued)

OTHER PUBLICATIONS

Evolve Your Website—Make It Responsive, Pepper Digital UK, 2012; Accessed Feb. 17, 2016, <http://www.responsivewebdesign.co.uk/> (3 pages).

(Continued)

*Primary Examiner* — Mohammed H Zuberi
(74) *Attorney, Agent, or Firm* — Stratford Managers Corporation

(57) ABSTRACT

Large and complex data sets can be difficult to view on devices with small screens, such as on smartphones, or in small windows on devices with large screens. The presently disclosed systems, methods and apparatus can determine characteristics associated with a display used to display a requested resource. Based on these determined characteristics, the systems and methods can determine whether the requested resource should be reformatted to fit the display. The requested resource can be reformatted to allow a user to consume complex data on a small display easily and effectively. In some embodiments, this can be done by ensuring that the current data context, previously provided by row/column headers, are always in view in a compact format.

23 Claims, 18 Drawing Sheets

(56) References Cited

U.S. PATENT DOCUMENTS

| | | | | |
|---|---|---|---|---|
| 2007/0174291 A1* | 7/2007 | Cooper | ............... | G06F 17/2229 |
| 2007/0192686 A1* | 8/2007 | Fortes | ................... | G06F 17/211 |
| | | | | 715/244 |
| 2007/0265863 A1* | 11/2007 | Tien | ....................... | G06Q 30/00 |
| | | | | 715/825 |
| 2008/0034314 A1* | 2/2008 | Louch | ................... | G06F 3/0481 |
| | | | | 715/778 |
| 2010/0205521 A1* | 8/2010 | Folting | ................. | G06F 17/246 |
| | | | | 715/227 |
| 2012/0117476 A1 | 5/2012 | Siegrist et al. | | |
| 2012/0284631 A1 | 11/2012 | Lancioni et al. | | |
| 2013/0132830 A1* | 5/2013 | Bell | ....................... | G06F 17/212 |
| | | | | 715/253 |
| 2013/0174063 A1* | 7/2013 | Chmiel | ................. | G06F 3/0484 |
| | | | | 715/762 |
| 2014/0372539 A1* | 12/2014 | Zaveri | .................. | H04L 51/046 |
| | | | | 709/206 |

OTHER PUBLICATIONS

Responsive Data Chart, DST Systems, Inc., 2014; Accessed Feb. 17, 2016, <http://www.informed-design.com/responsive/chart/> (2 pages).
Bootstrap • The world's most popular mobile-first and responsive front-end framework, (Originally released on Friday, Aug. 19, 2011) Accessed Feb. 17, 2016, http://getbootstrap.com/ (3 pages).
International Search Report and Written Opinion for International Application No. PCT/IB2015/002185 dated Feb. 10, 2016 (8 pages).

* cited by examiner

FIG. 3

| | C1 LABEL | C2 LABEL | C3 LABEL | C4 LABEL | C5 LABEL | C6 LABEL | C7 LABEL | C8 LABEL | C9 LABEL |
|---|---|---|---|---|---|---|---|---|---|
| R1 LABEL | R1C1 | R1C2 | R1C3 | R1C4 | R1C5 | R1C6 | R1C7 | R1C8 | R1C9 |
| R2 LABEL | R2C1 | R2C2 | R2C3 | R2C4 | R2C5 | R2C6 | R2C7 | R2C8 | R2C9 |
| R3 LABEL | R3C1 | R3C2 | R3C3 | R3C4 | R3C5 | R3C6 | R3C7 | R3C8 | R3C9 |
| R4 LABEL | R4C1 | R4C2 | R4C3 | R4C4 | R4C5 | R4C6 | R4C7 | R4C8 | R4C9 |
| R5 LABEL | R5C1 | R5C2 | R5C3 | R5C4 | R5C5 | R5C6 | R5C7 | R5C8 | R5C9 |
| R6 LABEL | R6C1 | R6C2 | R6C3 | R6C4 | R6C5 | R6C6 | R6C7 | R6C8 | R6C9 |
| R7 LABEL | R7C1 | R7C2 | R7C3 | R7C4 | R7C5 | R7C6 | R7C7 | R7C8 | R7C9 |
| R8 LABEL | R8C1 | R8C2 | R8C3 | R8C4 | R8C5 | R8C6 | R8C7 | R8C8 | R8C9 |
| R9 LABEL | R9C1 | R9C2 | R9C3 | R9C4 | R9C5 | R9C6 | R9C7 | R9C8 | R9C9 |

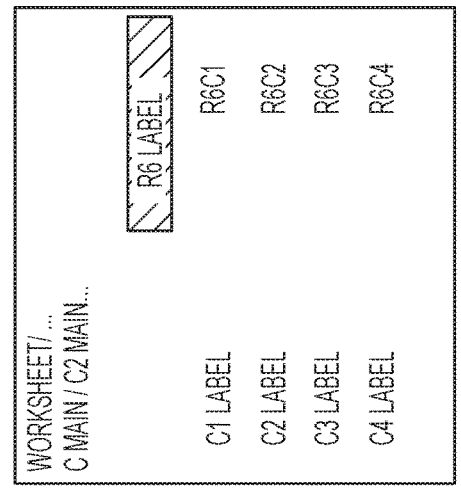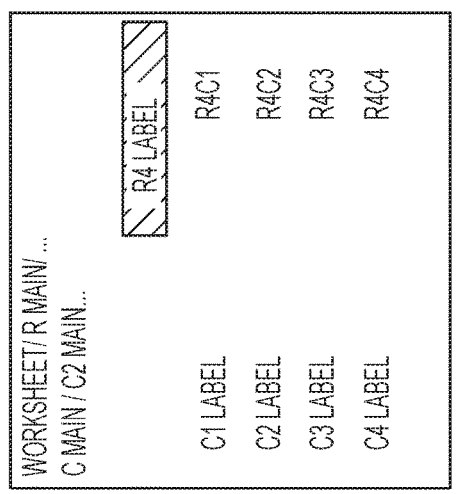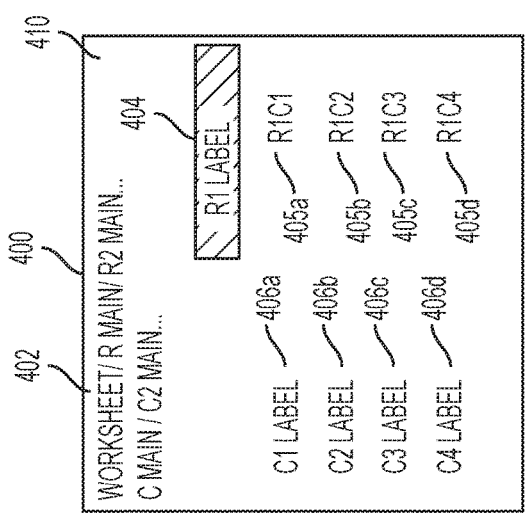
FIG. 4A
FIG. 4B
FIG. 4C
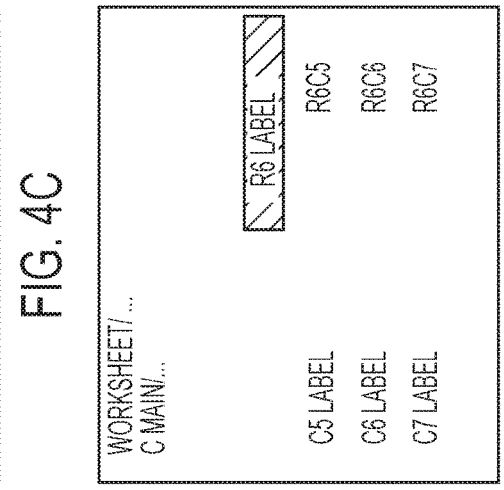
FIG. 4D
FIG. 4E
FIG. 4F

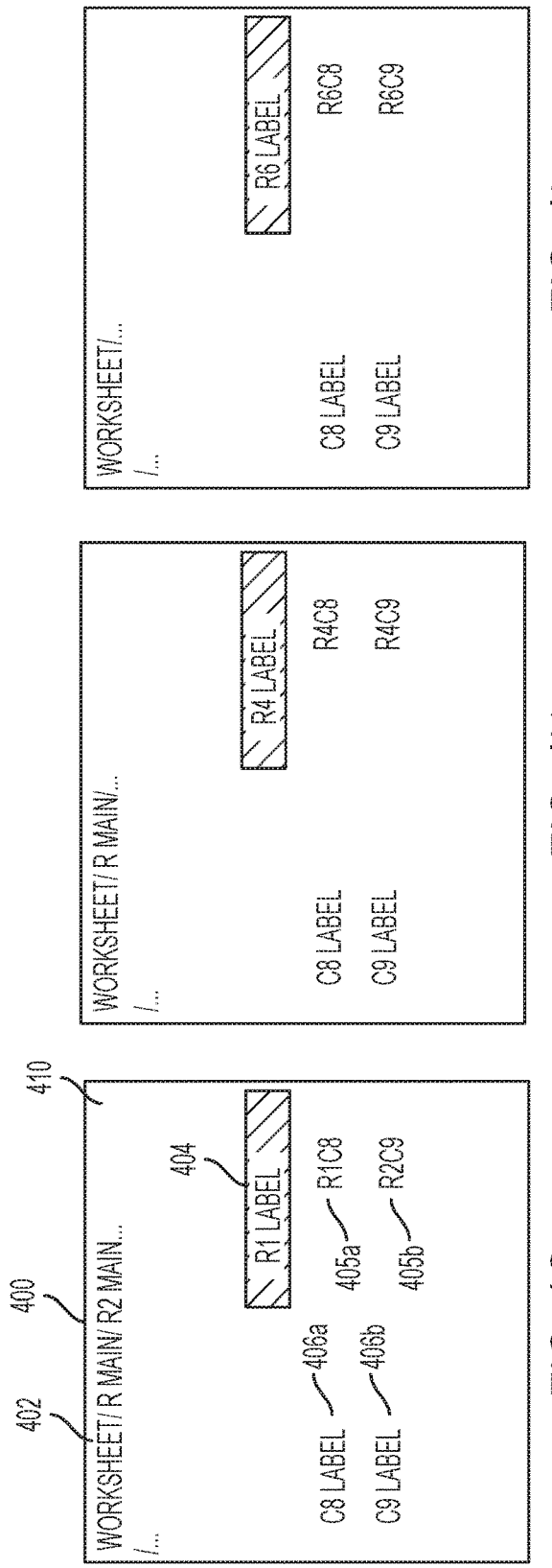

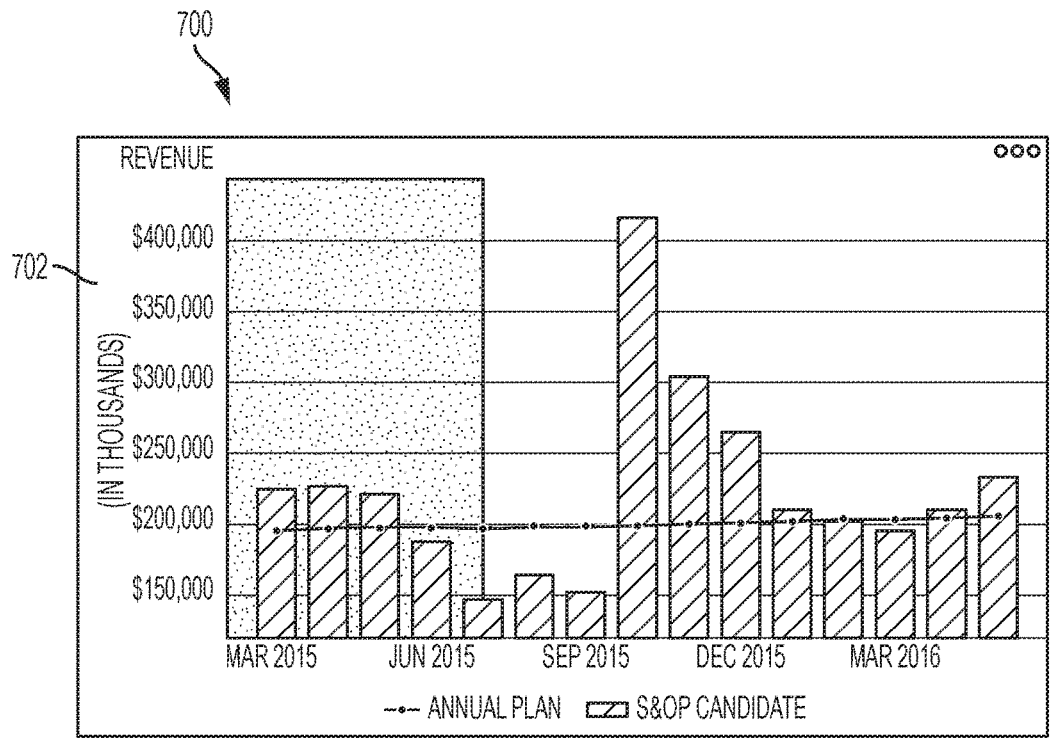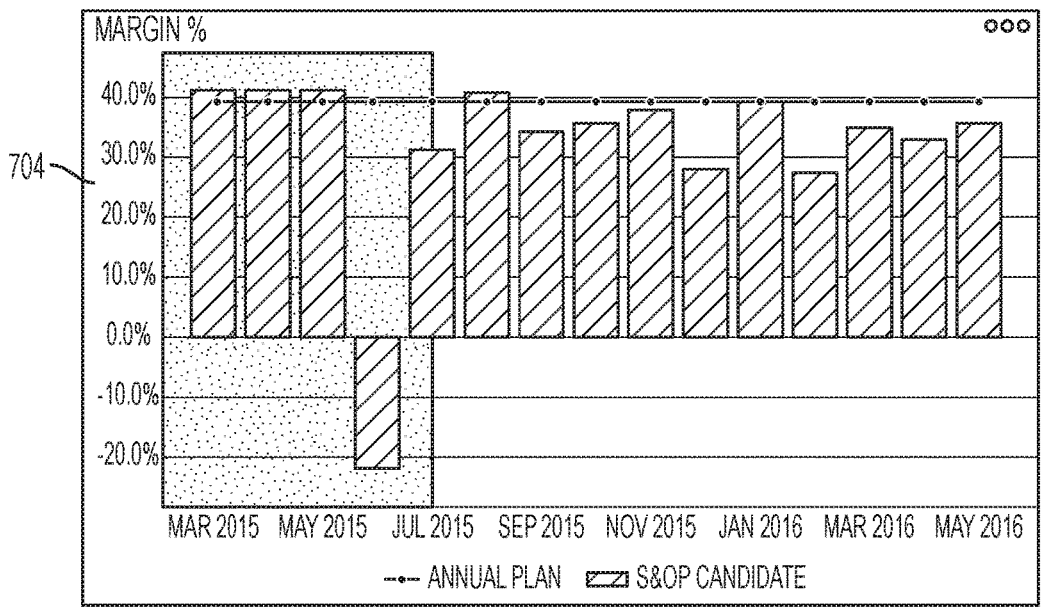
FIG. 7A

CORPORATE METRICS

06-01-15 TO 05-31-16

| METRIC — 801 | WEIGHT — 803 | ANNUAL PLAN — 805 | | ENTERPRISE DATA — 807 | |
|---|---|---|---|---|---|
| REVENUE — 802a | 20.0% — 804a | $2,419,758,647 | 806a | $2,696,859,922 | 808a ✓ |
| MARGIN % — 802b | 20.0% — 804b | 39.3% | 806b | 34.8% | 808b ✗ |
| KEY CONSTRAINT UTILIZATION — 802c | 20.0% — 804c | 95.0% | 806c | 92.8% | 808c △ |
| ENDING INVENTORY — 802d | 20.0% — 804d | $56,589,611 | 806d | $17,048,450 | 808d ✓ |
| ON TIME TO REQUEST — 802e | 20.0% — 804e | 95.0% | 806e | 51.1% | 808e ✗ |
| OVERALL SCORE — 810 | | | | 104.2% | 812 |

Corporate Metrics dashboard (900a), date range 06-01-15 TO 05-31-16:
- ANNUAL PLAN — 905
  - REVENUE — 902aa: $2,419,758,647
  - MARGIN % — 902ab: 39.3%  (902ac)
  - KEY CONSTRAINT UTILIZATION — 902ac: 95.0%
  - ENDING INVENTORY — 902ad: $56,589,611
  - ON TIME TO REQUEST — 902ae: 95.0%
- ENTERPRISE DATA — 907 (912: 104.2%)
  - REVENUE — 902ba: $2,696,859,922 ✓ (908a)
  - MARGIN % — 902bb: 34.8% ✗ (908b)
  - KEY CONSTRAINT UTILIZATION — 902bc: 92.8% △ (908c)
  - ENDING INVENTORY — 902bd: $17,048,450 ✓ (908d)
  - ON TIME TO REQUEST — 902be: 51.1% ✗ (908e)

FIG. 9B

Corporate Metrics dashboard (900b), date range 06-01-15 TO 05-31-16, ACTUAL VALUES:
- OVERALL SCORE — 910: 104.2% (912)
- ENTERPRISE DATA — 907a
- REVENUE — 902a   WEIGHT: 20.0% (904a)
  - ANNUAL PLAN — 905a: $2,419,758,647 (906a)
  - ENTERPRISE DATA — 907a: $2,696,859,922 ✓ (908a)
- MARGIN % — 902b   WEIGHT: 20.0% (904b)
  - ANNUAL PLAN — 905b: 39.3% (906b)
  - ENTERPRISE DATA — 907b: 34.8% ✗ (908b)
- KEY CONSTRAINT UTILIZATION — 902c   WEIGHT: 20.0% (904c)
  - ANNUAL PLAN — 905c: 95.0% (906c)
  - ENTERPRISE DATA — 907c: 92.8% △ (908c)

RESPONSIVE DATA EXPLORATION ON SMALL SCREEN DEVICES

CROSS REFERENCE TO RELATED APPLICATIONS

This application claims benefit under 35 U.S.C. § 119(e) of U.S. Provisional Patent Application No. 62/068,975, filed Oct. 27, 2014, entitled "Responsive Tabular Data Exploration on Small Screen Devices," as well as U.S. Provisional Patent Application No. 62/069,019, filed Oct. 27, 2014, entitled "Responsive Interactive Dashboards," the contents of both of which are incorporated by reference in their entirety.

TECHNICAL FIELD

This disclosure relates to interactive data exploration and visualization, particularly in mobile devices.

BACKGROUND

Large and complex data sets can be difficult to view on devices with small screens, such as on smartphones, or in small windows or viewports on devices with large screens. In the context of spreadsheets, for example, some approaches to viewing large data sets on small screens focus on treating the large data set as a "baby spreadsheet," and present data in the same way as a large screen view. This approach can make it hard to navigate data sets of moderate to large size. For example, the user will typically need to scroll through many rows and columns before reaching a particular cell that he or she is interested in. Furthermore, row and column headings can be far removed from a particular cell of interest, which can force the user to scroll back and forth repeatedly to find and understand the context of that cell. Row and column headings can be "locked" according to known techniques such that no matter how far a user scrolls down and to the right, column headings will always appear at the top of a display, and row headings will always appear to the left of the display. However, in spreadsheets where there are many layers of row and column headings, such as when row and column headings are organized in a nested hierarchy having two or more levels, "locking" row and column headings so that they are always visible can take up valuable space on a small display.

In the context of dashboards of graphs or charts, layouts that are effective on a large display can also be difficult to consume on a small display. For example, layouts that arrange graphs or charts next to each other on a horizontal line can be difficult and non-intuitive for a user to navigate. Furthermore, graphs or charts can be sized too tall or too wide for a small screen, thus forcing the user to scroll back and forth repeatedly to see the whole graph or chart at once.

SUMMARY

In one aspect, the present disclosure is directed at a computer system comprising at least one memory configured to store: (i) a plurality of resources, each resource being associated with a different, pre-authored resource-specific format, and (ii) a formatting rule. The computer system can also comprise at least one processor configured to receive a request for a resource of the plurality of resources, determine a parameter associated with a display for displaying the set of data, and compare the determined parameter to pre-determined criteria. When the determined parameter does not meet the pre-determined criteria, the at least one processor can display the requested resource according to the pre-authored resource-specific format associated with the requested resource. When the determined parameter does meet the pre-determined criteria, the at least one processor can adjust the pre-authored resource-specific format associated with the requested resource based on the formatting rule to generate an adjusted format, and display the requested resource according to the adjusted format.

In some embodiments, each resource of the plurality of resources can be a spreadsheet having a plurality of cells arranged in a plurality of rows and a plurality of columns, wherein each cell can be associated with a row having one or more row labels and with a column having one or more column labels. The at least one processor can be configured to, when the determined parameter does meet the pre-determined criteria, adjust the pre-authored resource-specific format associated with the requested resource based on the formatting rule to generate an adjusted format by (i) selecting a subset of the plurality of cells, and (ii) generating a breadcrumb trail comprising at least part of a set of labels comprising row labels of rows associated with cells in the subset of cells and column labels of columns associated with cells in the subset of cells. The at least one processor can also display the requested resource according to the adjusted format by displaying a first card comprising the selected subset of cells and the generated breadcrumb trail.

In some embodiments, the breadcrumb trail can comprise only row labels and column labels associated with every cell in the subset of cells In some embodiments, at least one of the row labels and the column labels can be organized according to a nested hierarchy having two or more levels.

In some embodiments, the at least one processor can be further configured to receive user input directing the computer system to navigate in at least one of a horizontal direction and a vertical direction. In response to the user input, the at least one processor can display a second card comprising (i) a second subset of the plurality of cells based on the received user input, and (ii) a second breadcrumb trail comprising at least part of a second set of labels comprising row labels of rows associated with cells in the second subset of cells and column labels of columns associated with cells in the second subset of cells.

In some embodiments, each resource of the plurality of resources can be a dashboard having a plurality of sub-displays. The at least one processor can be configured to, when the determined parameter does meet the pre-determined criteria, adjust the pre-authored resource-specific format associated with the requested resource based on the formatting rule to generate an adjusted format by (i) arranging each sub-display into a stacked column, and (ii) resizing each sub-display based on the determined parameter.

In some embodiments, each resource of the plurality of resources can be a scorecard having a plurality of metrics, and at least one data column configured to store data corresponding to each metric of the plurality of metrics. The at least one processor can be configured to, when the determined parameter does meet the pre-determined criteria, adjust the pre-authored resource-specific format associated with the requested resource based on the formatting rule to generate an adjusted format by (i) generating a separate data section for each of the at least one data column, and (ii) adding a line item to each separate data section for each metric of the plurality of metrics. The at least one processor can also be configured to do this by (i) generating a separate metric section for each metric of the plurality of metrics, and (ii) adding a line item to each separate metric section for each of the at least one data column.

In some embodiments, the parameter associated with the display can comprise at least one of a dimension and a size associated with a physical screen. In other embodiments, the parameter associated with the display can comprise a size associated with a viewport being displayed on a physical screen.

In another aspect, the present disclosure is directed at a computer system comprising at least one memory configured to store: (i) a plurality of resources, each resource being associated with a different, pre-authored resource-specific format, and with a resource type of a plurality of resource types, wherein each resource type is associated with two or more resources; and (ii) a plurality of formatting rules, each formatting rule being associated with a resource type of the plurality of resource types. The computer system can also comprise at least one processor configured to: receive a request for a resource of the plurality of resources, determine a parameter associated with a display for displaying the set of data, and compare the determined parameter to pre-determined criteria. When the determined parameter does not meet the pre-determined criteria, the at least one processor can display the requested resource according to the pre-authored resource-specific format associated with the requested resource. When the determined parameter does meet the pre-determined criteria, the at least one processor can select a formatting rule of the plurality of formatting rules based on the resource type associated with the requested resource; adjust the pre-authored resource-specific format associated with the requested resource based on the selected formatting rule to generate an adjusted format, and display the requested resource according to the adjusted format.

In some embodiments, the plurality of resource types can include a spreadsheet resource type, a dashboard resource type, and a scorecard resource type.

In another aspect, the present disclosure is directed at a method for displaying resources on different types of displays. The method can comprise storing, in at least one memory, (i) a plurality of resources, each resource being associated with a different, pre-authored resource-specific format, and (ii) a formatting rule. The method can further comprise receiving, by at least one processor, a request for a resource of the plurality of resources; determining, by the at least one processor, a parameter associated with a display for displaying the set of data; and comparing, by the at least one processor, the determined parameter to pre-determined criteria. When the determined parameter does not meet the pre-determined criteria, the method can comprise displaying the requested resource according to the pre-authored resource-specific format associated with the requested resource. When the determined parameter does meet the pre-determined criteria, the method can comprise adjusting the pre-authored resource-specific format associated with the requested resource based on the formatting rule to generate an adjusted format, and displaying the requested resource according to the adjusted format.

In some embodiments, each resource of the plurality of resources can be a spreadsheet having a plurality of cells arranged in a plurality of rows and a plurality of columns, wherein each cell is associated with a row having one or more row labels and with a column having one or more column labels. Furthermore, adjusting the pre-authored resource-specific format associated with the requested resource based on the formatting rule to generate an adjusted format can comprise: (i) selecting a subset of the plurality of cells, and (ii) generating a breadcrumb trail comprising at least part of a set of labels comprising row labels of rows associated with cells in the subset of cells and column labels of columns associated with cells in the subset of cells. Furthermore, displaying the requested resource according to the adjusted format can comprise displaying a first card comprising the selected subset of cells and the generated breadcrumb trail.

In some embodiments, the breadcrumb trail can comprise only row labels and column labels associated with every cell in the subset of cells.

In some embodiments, at least one of the row labels and the column labels can be organized according to a nested hierarchy having two or more levels.

In some embodiments, the method can further comprise receiving user input directing the at least one processor to navigate in at least one of a horizontal direction and a vertical direction. The method can also comprise displaying a second card comprising (i) a second subset of the plurality of cells based on the received user input, and (ii) a second breadcrumb trail comprising at least part of a second set of labels comprising row labels of rows associated with cells in the second subset of cells and column labels of columns associated with cells in the second subset of cells.

In some embodiments, each resource of the plurality of resources can be a dashboard having a plurality of sub-displays. Furthermore, adjusting the pre-authored resource-specific format associated with the requested resource based on the formatting rule to generate an adjusted format can comprise (i) arranging each sub-display into a stacked column, and (ii) resizing each sub-display based on the determined parameter.

In some embodiments, each resource of the plurality of resources can be a scorecard having a plurality of metrics, and at least one data column configured to store data corresponding to each metric of the plurality of metrics. Adjusting the pre-authored resource-specific format associated with the requested resource based on the formatting rule to generate an adjusted format can comprise: (i) generating a separate data section for each of the at least one data column, and (ii) adding a line item to each separate data section for each metric of the plurality of metrics. Adjusting the pre-authored resource-specific format associated with the requested resource based on the formatting rule to generate an adjusted format can also comprise: (i) generating a separate metric section for each metric of the plurality of metrics, and (ii) adding a line item to each separate metric section for each of the at least one data column.

In some embodiments, the parameter associated with the display can comprise at least one of a dimension and a size associated with a physical screen. In other embodiments, the parameter associated with the display can comprise at least one of a dimension and a size associated with a viewport being displayed on a physical screen.

In yet another aspect, the present disclosure is directed at a method for displaying resources on different types of displays. The method can comprise storing, in at least one memory: (i) a plurality of resources, each resource being associated with a different pre-authored resource-specific format, and with a resource type of a plurality of resource types, wherein each resource type is associated with two or more resources; and (ii) a plurality of formatting rules, each formatting rule being associated with a resource type of the plurality of resource types. The method can further comprise receiving, by at least one processor, a request for a resource of the plurality of resources; determining, by the at least one processor, a parameter associated with a display for displaying the set of data; and comparing, by the at least one processor, the determined parameter to pre-determined criteria. When the determined parameter does not meet the pre-determined criteria, the method can comprise displaying the requested resource according to the pre-authored resource-specific format associated with the requested resource. When the determined parameter does meet the pre-determined criteria, the method can comprise selecting a formatting rule of the plurality of formatting rules based on the resource type of the requested resource; adjusting the pre-authored resource-specific format associated with the requested resource based on the selected formatting rule to generate an adjusted format, and displaying the requested resource according to the adjusted format.

In some embodiments, the plurality of resource types can include a spreadsheet resource type, a dashboard resource type, and a scorecard resource type

BRIEF DESCRIPTION OF THE DRAWINGS

FIG. 3 depicts an exemplary worksheet that can be displayed on a large display, according to some embodiments.

FIGS. 4A, 4B, 4C, 4D, 4E, 4F, 4G, 4H, and 4I depict an exemplary format for displaying the same data shown in FIG. 3 on a smaller display, according to some embodiments.

FIGS. 7A, 7B, and 7C depict an exemplary format for displaying the same data shown in FIG. 6 on a smaller display, according to some embodiments.

FIG. 8 depicts an exemplary scorecard that can be displayed on a large display, according to some embodiments.

FIGS. 9A and 9B depict exemplary formats for displaying the same data shown in FIG. 8 on a smaller display, according to some embodiments.

DISCLOSURE

Figure 1:
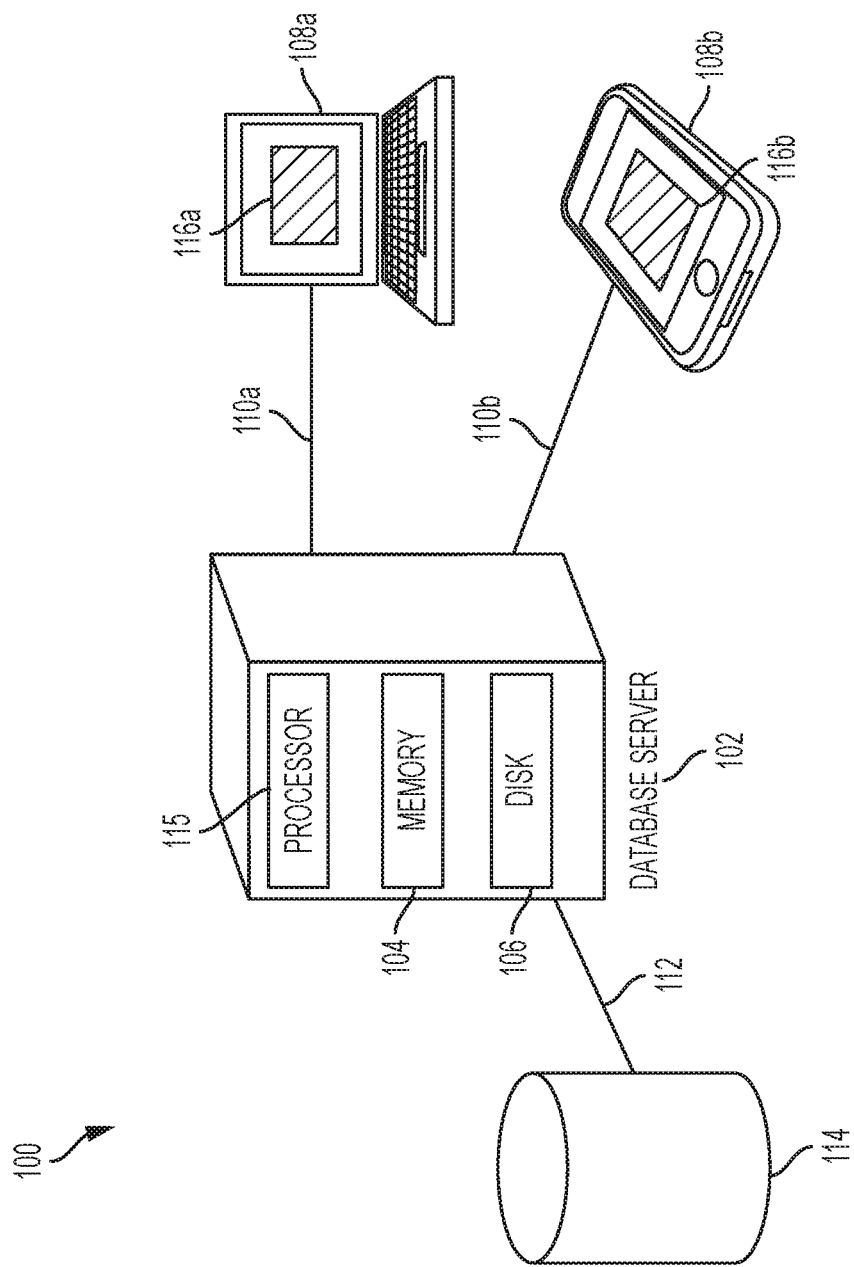
FIG. 1 depicts an exemplary system for storing and viewing large databases, according to some embodiments.

Complex data can sometimes be presented in the form of tables, spreadsheets, scorecards, or dashboards that are difficult to parse and consume on devices with small screens (such as a smartphone) or on small windows or viewports being displayed on devices with large screens. The systems and methods described here allow a user to consume complex data on a small display easily and effectively. Large and complex data structures can automatically be made understandable and navigable on a small screen device, or on a small window or viewport on a large screen device.

The systems and methods can make sure that the current data context, previously provided by row/column headers, are always in view; they can make it easy to pivot the view so that data can be compared from a different perspective. They can also provide natural gestures for navigating the view of data.

The systems and methods can also include a new "card view", allow data context in grouped data to be visible at all times, automatically arrange complex grouped data into a view that is suitable for a small display, allow for "on the go" access to details that users would normally access from their desktops or laptops, and easily facilitate modification of how row and column data is presented (for example "by customer" or "by time").

Furthermore, the systems and methods can allow grouped data of arbitrary complexity to be consumed on a small display; allow data to be navigated easily; facilitate automated responsive design without user intervention or special authoring requirements; and support operation on any device.

In possible variations, charts with data cells, dashboards, and scorecards of arbitrary complexity can be re-organized and re-formatted to facilitate intuitive and easy consumption on small devices, or in small windows/viewports on large devices. Extra data exploration capabilities can also be implemented, such as sort, filter, and slice and dice. Systems and methods could provide richer data segmentation, pin and freeze, data editing, context based actions (e.g., drill to detail, open a form/dialog), and sharing of a particular data context with others.

Although the mobile use case is the focus of the disclosure, systems and methods described here could be used on any device and any screen size, and for various data visualization applications, e.g., enterprise data, scientific data, consumer data, etc.

The device displaying the content, which can be mobile, such as a laptop, tablet, or smartphone, can have an application or app downloaded with the ability to display the data as described. In such a system, the displaying device can include the display, a processor for controlling the display, and a memory. The device can also include radio circuitry and baseband for receiving the app and thereafter for receiving data for display. The processing can also be partly or wholly implemented at a central server where the data resides.

The system can be used to display data from a database, such as a large multi-version database shown in U.S. Patent Publication No. 2013/0311422, the contents of which is incorporated herein by reference.

Turning to the figures, FIG. 1 illustrates a non-limiting example of a system 100 for storing and viewing large databases in accordance with certain embodiments of the present disclosure. System 100 includes a database server 102, a large versioned database 114, and client devices 108a and 108b. Database server 102 can include a memory 104, a disk 106, and one or more processors 115. In some embodiments, memory 104 can be volatile memory, compared with disk 106 which can be non-volatile memory. In some embodiments, database server 102 can communicate with a versioned database 114 using interface 112. While database 114 is illustrated as separate from database server 102, other embodiments are also possible. For example, database 114 can be integrated into database server 102, either as a separate component within database server 102, or as part of at least one of memory 104 and disk 106. A versioned database can refer to a database which efficiently provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 104 and disk 106. Storage media includes volatile and nonvolatile, removable and non-removable media implemented in any method or technology for storage of information such as computer-readable instructions, data structures, program modules or other data. Memory 104 and disk 106 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 110a, 110b, and 112. Interfaces 110a-b and 112 can allow components of system 100 to communicate with each other and with other devices. For example, database server 102 can communicate with database 114 using interface 112. Database server 102 can also communicate with client devices 108a and 108b via interfaces 110a and 110b, respectively. Client devices 108a and 108b can be different types of client devices; for example, client device 108a can be a desktop or laptop with a full-sized screen (e.g., an integrated screen in the case of a laptop, or a separate monitor coupled to a desktop), whereas client device 108b can be a mobile device such as a smartphone or tablet with a smaller screen. Non-limiting example interfaces 110a-b, and 112 can include wired communication links such as a wired network or direct-wired connection, and wireless communication links such as a cellular network, radio frequency (RF), infrared and/or other wireless links. Interfaces 110a-b and 112 can allow database server 102 to communicate with client devices 108a-b over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 110a-b and 112 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 112, database server 102 can retrieve one or more resources (e.g., documents or data, including spreadsheets, scorecards, dashboards, text, graphics, audio or video) from database 114. These one or more resources can be saved in disk 106 or memory 104. In some cases, database server 102 can also comprise a web server, and can format resources into a format suitable to be displayed on a web browser. Database server 102 can then send these resources to client devices 108a-b via interfaces 110a-b to be displayed on an application 116a-b. Application 116a-b can be a web browser or other application running on client devices 108a-b.

Application 116a-b can determine the characteristics of a display at client devices 108a-b for displaying resources. In some embodiments, these determinations can be implemented using Cascading Style Sheets (CSS) media queries. The determined characteristics can include a width, height, and/or size of a physical screen associated with a client device, a width, height, and/or size of a window or viewport being displayed on the client device, an orientation of the display (e.g., landscape vs. portrait), a resolution, a supported color scheme, and other parameters relevant to a display.

System 100 can be configured to alter the layout, formatting, and/or dimensions of resources displayed by client devices 108a-b depending on the determined display characteristics. In some embodiments, application 116a-b can communicate the determined display characteristics to database server 102, which can reformat a requested resource based on those determined display characteristics (potentially at processor 115) before sending the reformatted resource to the application that requested it. In other embodiments, application 116a-b can reformat resources received from database server 102 based on the determined display characteristics. In yet other embodiments, database server 102 can reformat part of a requested resource, and application 116a-b can reformat another part of the requested resource.

In some embodiments, system 100 can be configured to reformat a requested resource automatically, without requiring input from either a user operating client device 108a-b, or from a content developer or system administrator. Prior known devices can sometimes detect when a user is accessing a website from a mobile device as opposed to a laptop or desktop with a large screen, and can direct the user to a mobile-specific version of the same website. This prior approach, however, requires a website or content developer to create two parallel versions of the same website: one for consumption on large screens, and another version for consumption on smaller screens. For example, if a user is accessing a website from a desktop, the user can be directed to a first version of the website at a first URL, e.g., http://www.bigbank.com. If the user is accessing the website from a mobile device, the user can be directed to a second version of the website at a second URL, e.g., http://www.bigbank.com/mobile, or http://www.m.bigbank.com. Even if two versions of a website can be implemented at the same URL, this approach requires additional cost and effort from developers to develop two versions of the same content: one for large screens (e.g., desktop monitors) and one for small screens (e.g., mobile smartphones). This approach is also difficult to scale and tailor to multiple screen sizes. For example, if developers wish to implement a customized view for medium-sized screens (e.g., tablets), developers must also incur the additional cost and effort of developing a third version of the same content.

In contrast, the presently disclosed system can be configured to alter the layout, formatting, and/or dimensions of documents/data to suit different display characteristics without requiring that the user or the developer build parallel websites or documents for consumption on large, medium, and/or small displays. In the context of a webpage being displayed on a browser, the presently disclosed system can allow users to access content using a single URL, rather than having to direct users to different URLs depending on system type. The presently disclosed system does this by using sets of pre-established rules for changing the layout, formatting, and/or dimensions of documents. These rules can be generally applicable to all types of content or to broad categories of content. For example, one set of rules can be used to reposition and resize rows and columns in spreadsheets. Another set of rules can be used to reposition and resize charts and graphs of data. Yet another set of rules can be used to reposition and resize elements of "scorecards" or summaries of enterprise-level metrics. By making these rules generally applicable to all content, or to broad categories of content, these rules obviate the need for developers to create parallel large, medium, and/or small versions of specific resources. Instead, developers need only create a single version of their content, and allow the rules to automatically reformat their content for display on different types of screens. These rules also allows for changing the layout, format, and size of displays when the user resizes a window being used to display the content.

Figure 2:
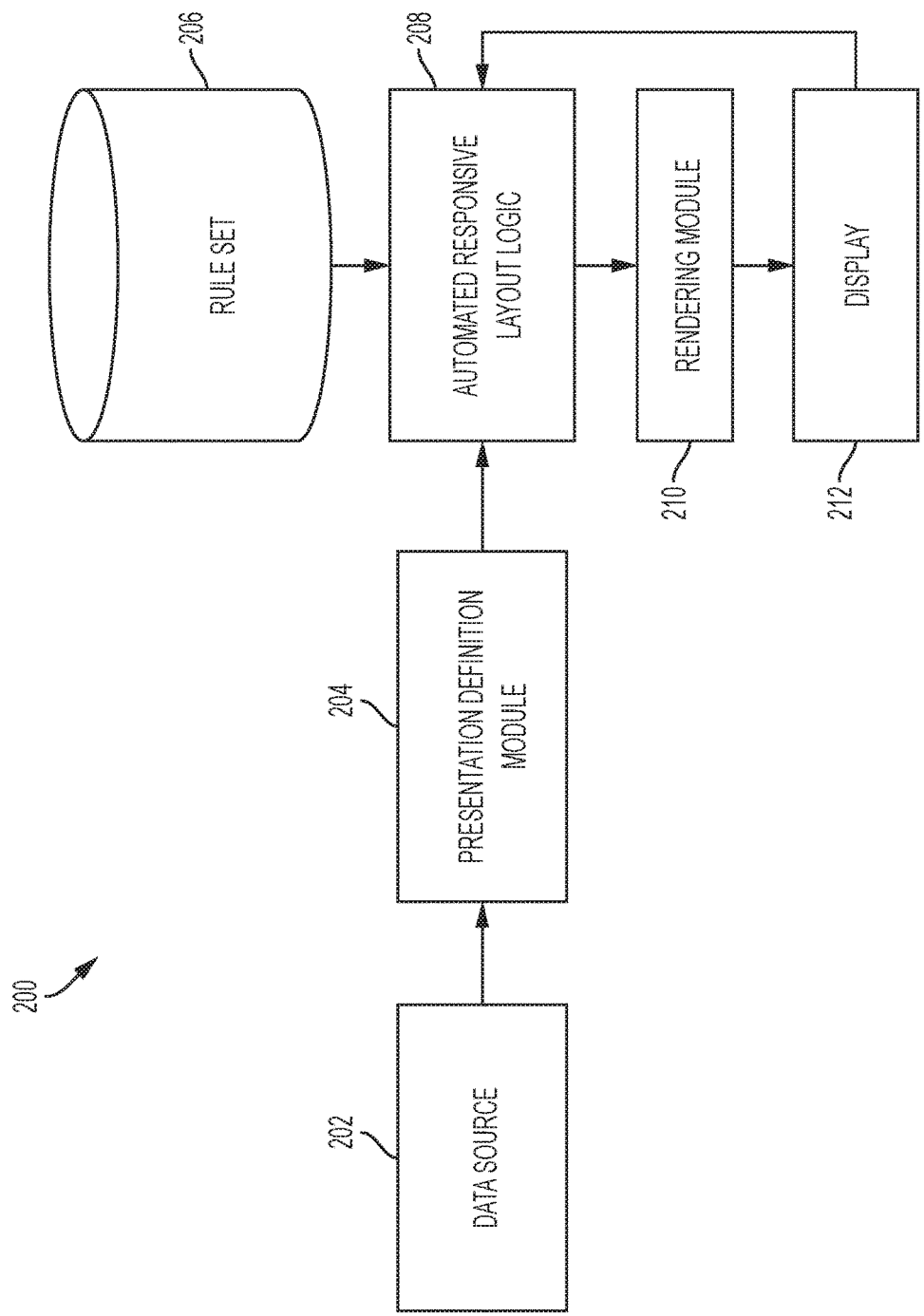
FIG. 2 depicts an exemplary system for defining and changing the layout of requested resources, according to some embodiments.

FIG. 2 is a logical block diagram illustrating an exemplary system 200 for defining and changing the layout of requested resources, according to some embodiments. System 200 can include a data source 202, a presentation definition module 204, a rule set 206, an automated responsive layout logic 208, a rendering module 210, and a display 212. Data source 202 can be any source of data associated with a requested resource, such as the data from which the contents of the requested resource are derived. In some embodiments, data source 202 can include data stored in database 114, disk 106, and/or memory 104, and can include raw data, such as text or numbers, without any formatting. Data source 202 can include any arbitrary type of data, including without limitation sales and operations data, forecasting data, inventory data, weather observation data, game data, medical patient data, etc.

Presentation definition module 204 can be a software or hardware module that defines a layout associated with a requested resource. In some embodiments, presentation definition module 204 can include layouts that are pre-authored by a user, such as a content developer or system administrator. These pre-authored layouts can format data from data source 202 in a way that is specific to the requested resource, such as providing a specific large-screen layout. This layout can be "specific" to the requested resource in that each resource can be associated with their own unique layout and format. For example, resources can be formatted according to a particular spreadsheet, tabular, chart, or dashboard format displaying a particular subset of data available from data source 202. Even among resources that are formatted according to the same general type of layout (e.g., a plurality of tables), resources can exhibit slight differences from each other (e.g., order, layout, font size, font color, relative size of tables, number of nested layers, etc.). These kinds of formatting differences can be captured and encoded by the pre-authored layouts stored by presentation definition module 204. Presentation definition module 204 can use the same memory as data source 202, or be implemented in a separate memory from data source 202. Presentation definition module 204 can also comprise a processing module that takes data from data source 202 and formats it according to stored resource-specific formats to provide formatted resources. These formatted resources can then be provided to the automated responsive layout logic 208. In some embodiments, presentation definition module can be implemented at any or all of database 114, disk 106, memory 104, and/or processor 115.

Rule set 206 can comprise a memory containing a set of rules for varying the layout of a requested resource depending on the characteristics of a display for displaying the requested resource. Rules stored in rule set 206 can comprise universal rules, or rules that can apply to multiple resources or types of resources. These rules can apply to these multiple resources and/or types of resources even if these resources are associated with different formats defined in the presentation definition module 204. For example, one set of rules can apply to all resources associated with a spreadsheet or tabular format, even if these resources contain different data, and are formatted differently (e.g., different number of labels, different layers of labels, etc.). Another set of rules can apply to all resources associated with a dashboard format, even if these resources exhibit different numbers and types of tables, font sizes, font colors, background colors, and layouts. Rule set 206 can be stored in the same or in separate memory from data source 202 and/or presentation definition module 204. In some embodiments, rule set 206 can be implemented at any or all of database 114, disk 106, and/or memory 104.

Automated responsive layout logic 208 can be a module that takes as input formatted resources from presentation definition module 204 and rules from rule set 206. Automated responsive layout logic 208 can also determine the characteristics of a display for displaying the requested resource (e.g., the characteristics of display 212). Based on these determined characteristics, automated responsive layout logic 208 can apply rules from rule set 206 to the formatted resources. Notably, automated responsive layout logic 208 can apply universal rules from rule 206 regardless of formatting, data, and other differences between different formatted resources. In this way, some embodiments of automated responsive layout logic 208 can change the layout of a resource with minimal or no human intervention—it can perform its task of adapting a resource to a particular screen type automatically. Once the rules from rule set 206 have been applied to the formatted resources, the automated responsive layout logic 208 can output the screen-specific formatted resources to a rendering module 210. Automated responsive layout logic 208 can be implemented as a software process configured to be executed on a processor, or as a separate application or logic-specific circuit. In some embodiments, automated responsive layout logic 208 can be implemented at processor 115, or as part of application 116a-b being executed on client devices 108a-b.

Rendering module 210 can receive the screen-specific formatted resources from automated responsive layout logic 208 and render them for display on display 212. In some embodiments, rendering module 210 can be implemented at processor 115 at database server 102, or at application 116a-b at client devices 108a-b. Display 212 can be implemented at client devices 108a-b.

FIG. 3 depicts an example worksheet 300 that can be displayed by system 100 and/or system 200 on a large display, such as on client device 108a, according to some embodiments. Worksheet 300 can have a name 302, such as "worksheet". Worksheet 302 can also comprise column headings 304 and row headings 306. Column headings 304 can be organized according to a nested hierarchy having two or more levels. The depicted exemplary worksheet has column labels organized according to a nested hierarchy having three levels: a first level with the labels "C Main", "C8 Label", and "C9 Label"; a second, more granular level nested within "C Main" at the first level, labeled "C2 Main", "C5 Label", "C6 Label", and "C7 Label"; and a third, more granular level nested within "C2 Main" at the second level, labeled "C1 Label", "C2 Label", "C3 Label", and "C4 Label". As an illustrative example, the first level of the hierarchy can refer to groups of four years: "C Main" can refer to the years "2015-2012", "C8 Label" can refer to years "2011-2008", and "C9 Label" can refer to years "2007-2004." The second level of the hierarchy can refer to specific years within groups of four years: "C2 Main" can refer to the year 2015, "C5" can refer to the year 2014, "C6" can refer to the year 2013, and "C7" can refer to the year 2012. The third-level of the hierarchy can refer to specific quarters within each year: "C1 Label" can refer to Q1 of 2015, "C2 Label" can refer to Q2 of 2015, "C3 Label" can refer to Q3 of 2015, and "C4 Label" can refer to Q4 of 2015. Other ways of organizing column headings 204, including ways with more or less hierarchical levels, or more or less labels within each level, are also possible.

Row headings 306 can also be organized according to a nested hierarchy having two or more levels. The depicted exemplary worksheet has row labels organized according to a nested hierarchy having three levels: a first level labeled "R Main", "R6 Label", "R7 Label", "R8 Label," and "R9 Label"; a second, more granular level nested within "R Main" at the first level labeled "R2 Main", "R4 Label", and "R5 Label"; and a third, more granular level nested within "R2 Main" at the second level labeled "R1 Label", "R2 Label", and "R3 Label." For example, the first level of the hierarchy can refer to geographical continents: "R Main" can refer to North America, "R6 Label" can refer to Europe, "R7 Label" can refer to South America, "R8 Label" can refer to Asia, and "R9 Label" can refer to Africa. The second level of the hierarchy can refer to specific countries within continents: "R2 Main" can refer to the United States, "R4 Label" can refer to Canada, and "R5 Label" can refer to Mexico. And the third level of the hierarchy can refer to specific regions within countries: "R1 Label" can refer to the East Coast, "R2 Label" can refer to Mid-Country, and "R3 Label" can refer to the West Coast. Other ways of organizing row headings 206, including ways with more or less hierarchical levels, or more or less labels within each level, are also possible.

Worksheet 300 can also comprise a plurality of cells arranged in a plurality of rows and a plurality of columns. Each cell can be associated with a row having one or more row labels, and with a column having one or more column labels. Each cell can also comprise data specific to that combination of row and column headings. Continuing with the example discussed above, if worksheet 300 contained historical sales data, R1C1 can contain sales data associated with Q1 of 2015 in the East Coast region of the United States, in North America. R2C3 can contain sales data associated with Q3 of 2015 in the Mid-Country region of the United States. R7C6 can contain historical sales data associated with the year 2013 in South America.

FIGS. 4A-I depict an exemplary format for displaying the same data shown in FIG. 3 on a smaller display, according to some embodiments. For example, the exemplary format in these figures can be used for viewing the data shown in FIG. 3 on a mobile device or in a smaller viewport on a large-screen device. The exemplary format organizes the data shown in FIG. 3 into a series of "cards" 400. Each card 400 can include data pertaining to a subset of the cells depicted in worksheet 300 in FIG. 3. This subset of cells can be a set of cells that share the same set of higher-level row and column labels. For example, FIG. 4A includes data pertaining to cells R1C1, R1C2, R1C3, and R1C4 which are displayed in data slots 405*a*, 405*b*, 405*c*, and 405*d* respectively. Each data slot 405*a-d* can be labeled using row and column labels. The column label 404 can be populated with the label "R1 Label", corresponding to the row heading "R1 Label" in FIG. 3. The row labels 406*a*, 406*b*, 406*c*, and 406*d* can be populated with the labels "C1 Label", "C2 Label", "C3 Label" and "C4 Label" corresponding to the column labels in FIG. 3.

Card 400 also includes a navigation aid, also known as a breadcrumb trail 402, that identifies the data being displayed on that card. For instance, breadcrumb trail 402 can show at least some of the row and/or column labels that are associated with the cells currently being displayed. In some cases, breadcrumb trail can show all of the row and/or column labels that are associated with each cell in the set of cells currently being displayed, except for those row labels and column labels currently being displayed in column label 404 and row labels 406*a-d* on card 400. In some embodiments, breadcrumb trail 402 can comprise two lines of text. The first line of text can include the name of the worksheet being displayed, and row labels that are associated with all of the cells currently being displayed. The displayed row labels can be ranked in order from most general to most specific, from most specific to most general, or in any arbitrary order. The second line of text can include column labels that are associated with all of the cells currently being displayed. The displayed column labels can also be ranked in order from most general to most specific, from most specific to most general, or in any arbitrary order. In the case of FIG. 4A, all of the displayed cells (i.e., R1C1, R1C2, R1C3, and R1C4) are associated with the worksheet titled "worksheet", the row heading aggregations "R Main" and "R2 Main", and the column heading aggregations "C Main" and "C2 Main." Therefore, the first line of breadcrumb trail 402 appears as "Worksheet/R Main/R2 Main . . . ", and the second line of breadcrumb trail 402 appears as "C Main/C2 Main . . . ". This breadcrumb trail identifies for the user all higher-level labels that pertain to the displayed cells (e.g., all row and column labels except for those labels already being displayed at column label 404 and row labels 406*a-d*) in a compact manner, thereby orienting the user to the context of the displayed cells without having to use pinned or frozen row/column labels that take up valuable display space. In some embodiments, the system can ensure that all cells displayed on a card 400 will all have the same breadcrumb, such that breadcrumb 402 can apply to all cells equally.

If the requested resource only contained a relatively small number of cells, a single card can be sufficient for displaying all cells in the resource. However, if the resource contained a modest or large number of cells, multiple cards can be used to display different parts of the spreadsheet. FIGS. 4B-I show other exemplary cards 400 which display other parts of worksheet 300. By swiping and/or scrolling left and right, or up and down, a user can switch between different cards in each of the different figures. For example, FIG. 4B depicts data pertaining to cells R4C1, R4C2, R4C3, and R4C4. The user can reach FIG. 4B from FIG. 4A by swiping or scrolling to the right. In some embodiments, a single swipe to the right can cause the system to display the next sequential row of data, whereas swiping to the left will cause the system to display the preceding row of data. In the example depicted in FIGS. 4A-I, if a user swipes once to the right from FIG. 4A, the system can display a card (not shown) that comprises cells R2C1, R2C2, R2C3, and R2C4. If the user swipes to the right a second time, the system can display another card (not shown) that comprises cells R3C1, R3C2, R3C3, and R3C4. If the user swipes to the right a third time, the system can display the card 400 depicted in FIG. 4B. In FIG. 4B, since the displayed cells now pertain to row "R4

Label" instead of "R1 Label", column label 404 changes from "R1 Label" to "R4 Label." Since R4C1, R4C2, R4C3, and R4C4 are all associated with the worksheet titled "worksheet", the row label "R Main", and the column labels "C Main" and "C2 Main," breadcrumb trail 402 can comprise a first line of text that shows "Worksheet/R Main/ . . . " and a second line of text "C Main/C2 Main . . . ". Comparing FIG. 4B to FIG. 4A, since R4C1, R4C2, R4C3, and R4C4 are no longer associated with the row label "R2 Main" (unlike R1C1, R1C2, R1C3, and R1C4, which are associated with row label "R2 Main"), breadcrumb 402 can change to omit row label "R2 Main" when switching from FIG. 4A to FIG. 4B.

If the user were to swipe or scroll further to the right, the system can continue to display cards comprising further rows of data, in sequential order. A fourth swipe to the right can bring up a card (not shown) comprising cells R5C1, R5C2, R5C3, and R5C4. A fifth swipe to the right can bring up the card 400 depicted in FIG. 4C, which displays cells R6C1, R6C2, R6C3, and R6C4. Since these cells are no longer associated with the row label "R Main", breadcrumb trail 402 can change to delete the row label "R Main" when transitioning from FIG. 4B to FIG. 4C.

FIG. 4D depicts data pertaining to cells R1C5, R1C6, and R1C7. The user can reach FIG. 4D from FIG. 4A by swiping or scrolling down once. Since the displayed cells now pertain to column labels "C5 Label", "C6 Label", and "C7 Label", row labels 406a-c can change to include those labels. All of the displayed cells in FIG. 4D are associated with the worksheet titled "worksheet", the row labels "R Main" and "R2 Main", and the column label "C Main." Therefore, breadcrumb 402 reads "Worksheet/R Main/R2 Main . . . " and "C Main/ . . . ".

Card 400 can be configured to display different numbers of cells depending on which cells are being displayed, and their context. For instance, card 400 can display only cells that all share the same breadcrumb trail 402. In FIG. 4D, cells R1C5, R1C6, and R1C7 can be selected for display because they all share the same breadcrumb, i.e., "Worksheet/R Main/R2 Main" and "C Main/ . . . ". If, for instance, the system had also displayed R1C8, this additional cell would not be associated with the higher-level column label "C Main", whereas R1C5, R1C6, and R1C7 would be associated with the higher-level column label "C Main." Therefore, since R1C8 would not be associated with the same breadcrumb as the preceding three cells, the system can determine to show only three cells instead of four. In some cases, configuring cards to display only cells that share the same breadcrumb trail can result in cards that show only one cell at a time. In cases where many cells in a single row share the same breadcrumb, these cells can be broken up to be displayed on multiple sequential cards, all sharing the same breadcrumb trail.

Similarly, FIG. 4E depicts data pertaining to cells R4C5, R4C6, and R4C7. The user can reach FIG. 4E by swiping or scrolling to the right three times from FIG. 4D, or by swiping or scrolling down from FIG. 4B. Since R4 is no longer associated with row label "R2 Main", breadcrumb 402 can change relative to FIG. 4D by deleting the row label "R2 Main." The resulting breadcrumb 402 can, as described above, show all row and column labels associated with the displayed cells other than those row and column labels displayed in column label 404 and row labels 406a-c. In this case, breadcrumb 402 can show "Worksheet/R Main" in the first line, and "C Main/ . . . " in the second line.

FIG. 4F depicts data pertaining to cells R6C5, R6C6, and R6C7. The user can reach FIG. 4F by swiping or scrolling down from FIG. 4C, or by swiping or scrolling right twice from FIG. 4E. Since R8 is not associated with either the higher-level row labels "R Main" or "R2 Main", breadcrumb 402 can include only the worksheet title "worksheet" in its first line. Similar to FIGS. 4E and 4D, the second line of breadcrumb 402 can remain unchanged: "C Main/ . . . ", since columns C5, C6, and C7 are all associated with C Main.

FIG. 4G depicts data pertaining to cells R1C8 and R1C9. The user can reach FIG. 4G by swiping or scrolling down from FIG. 4D. Here, since C8 and C9 are not associated with column label "C Main", the second line of breadcrumb trail 402 can change to delete that label when transitioning from FIG. 4D to 4G. In some embodiments, system 100 and/or 200 can be configured to not show a second line of text at all if the second line contains no labels to display.

FIG. 4H depicts data pertaining to cells R4C8 and R4C9. The user can reach FIG. 4H by swiping or scrolling down from FIG. 4E, or by swiping or scrolling to the right three times from FIG. 4G. Since R4 is not associated with higher-level row label "R2 Main", breadcrumb trail 402 can change to delete "R2 Main" from the first line when transitioning from FIG. 4G to 4H.

FIG. 4I depicts data pertaining to cells R6C8 and R6C9. The user can reach FIG. 4I by swiping or scrolling down from FIG. 4F, or by swiping or scrolling to the right twice from FIG. 4H. Since R6 is not associated with higher-level row label "R Main", breadcrumb trail 402 can change to delete "R Main" from the first line when transitioning from FIG. 4H to 4I.

Figure 5C:
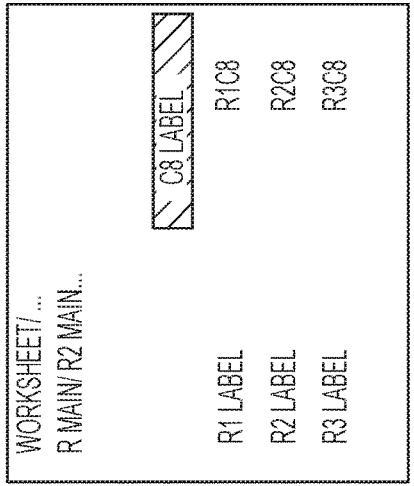
FIGS. 5A, 5B, 5C, 5D, 5E, 5F, 5G, 5H, and 5I depict an alternate exemplary format for displaying the same data shown in FIG. 3 on a smaller display, according to some embodiments.
Figure 5B:
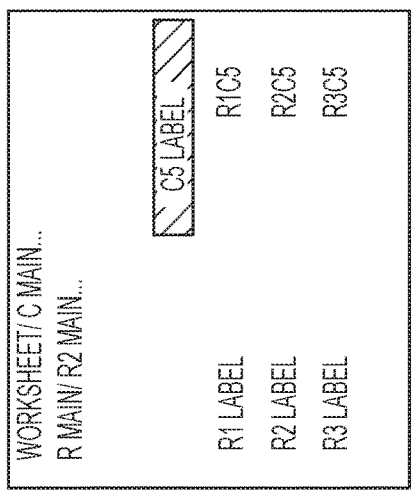
Figure 5F:
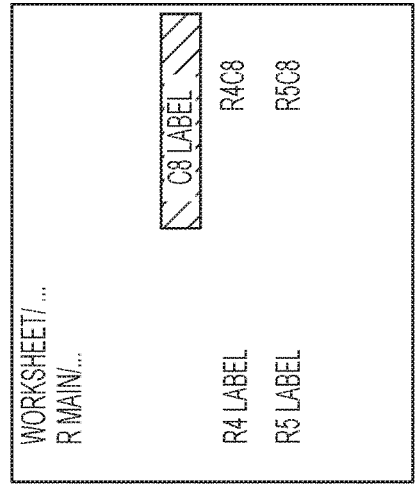
Figure 5E:
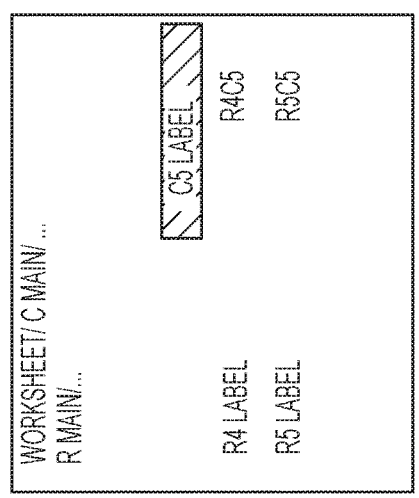
Figure 5A:
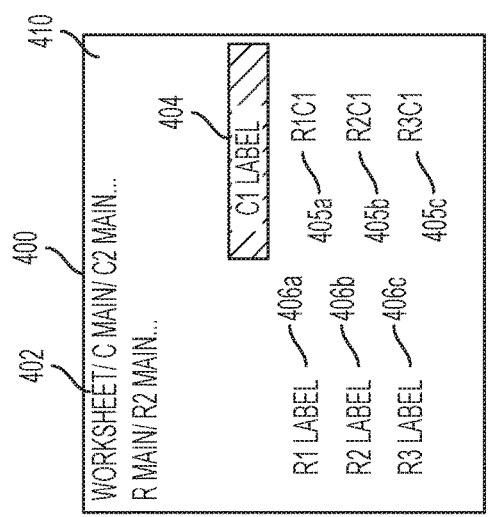
Figure 5D:
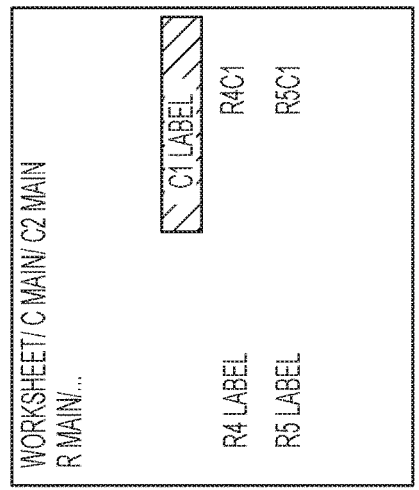
Figure 5I:
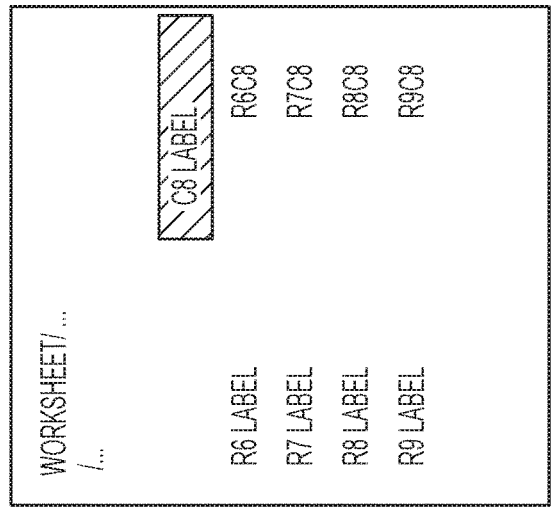
Figure 5H:
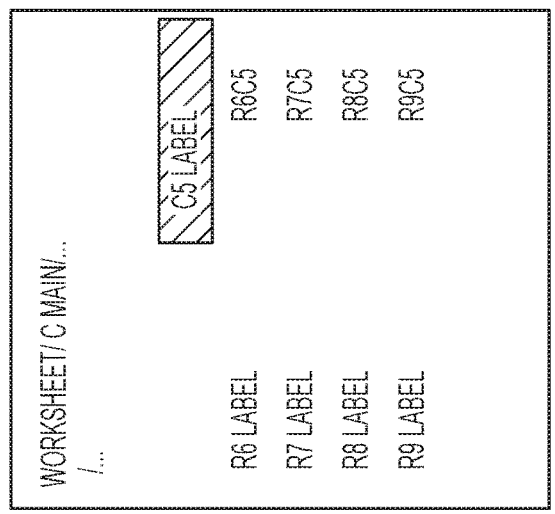
Figure 5G:
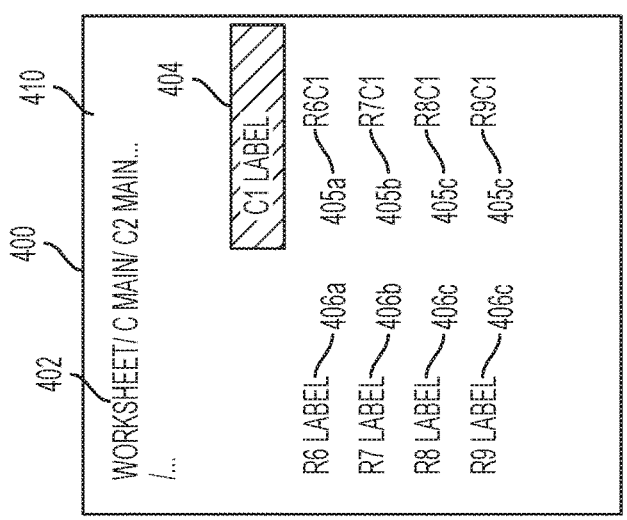
Figure 6A:
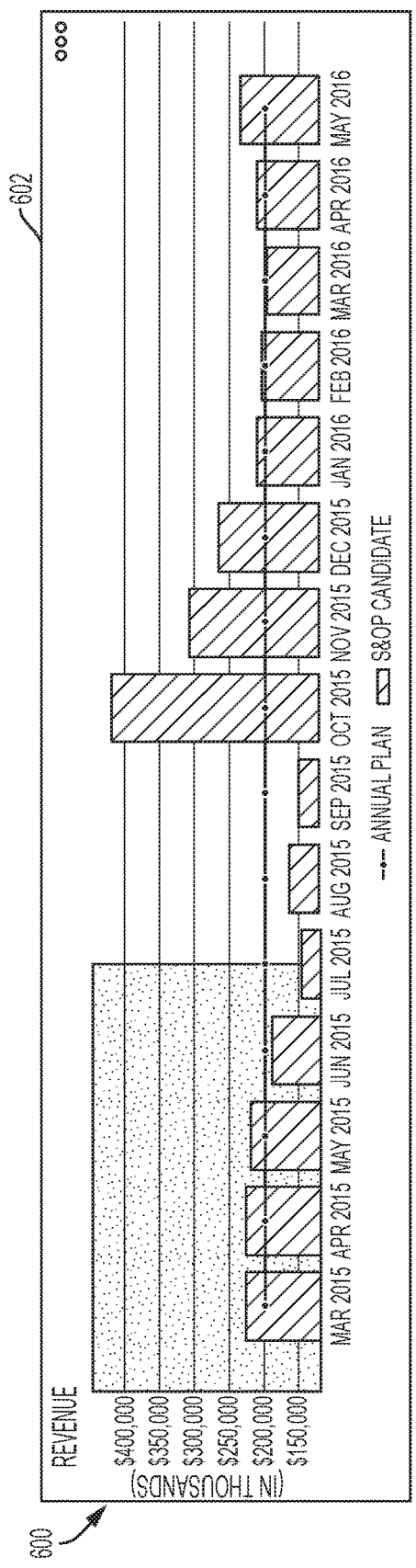
FIGS. 6A-6E depict an exemplary dashboard that can be displayed on a large display, according to some embodiments.
Figure 6B:
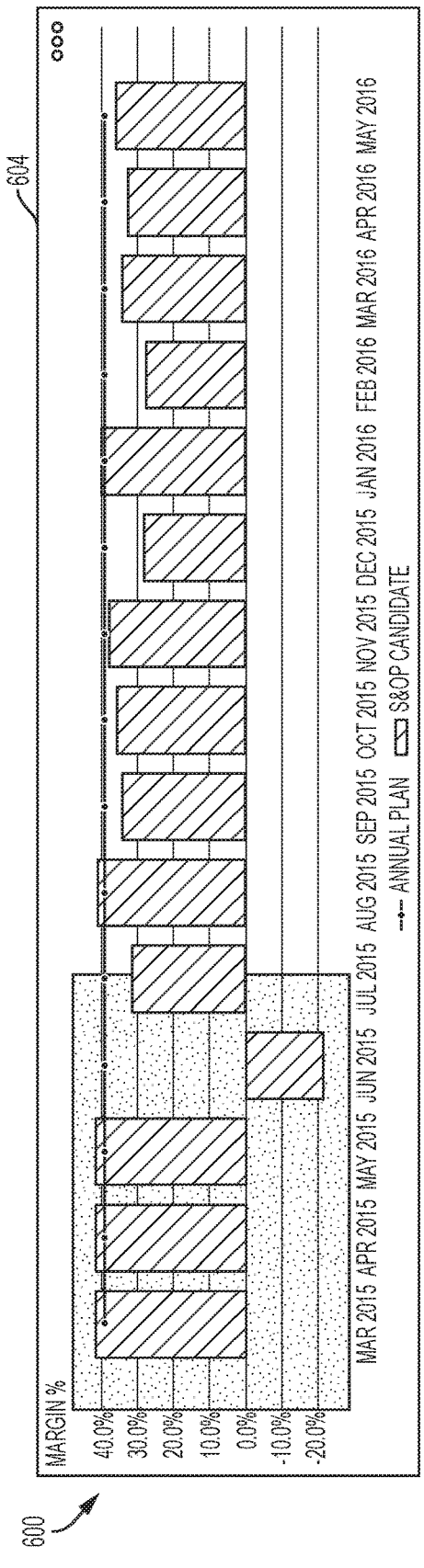
Figure 6C:
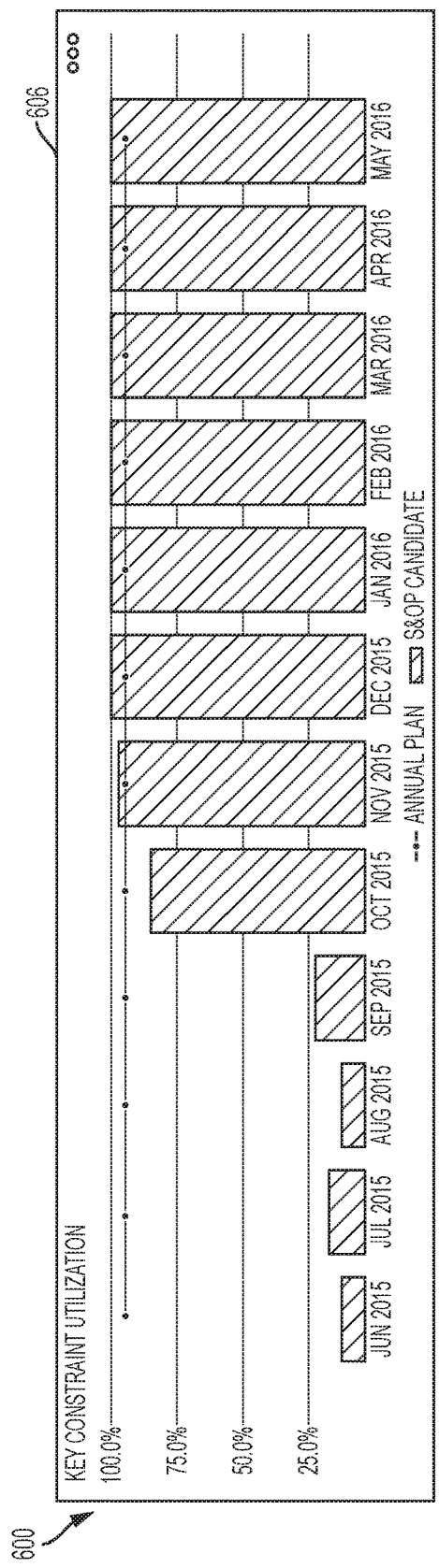
Figure 6D:
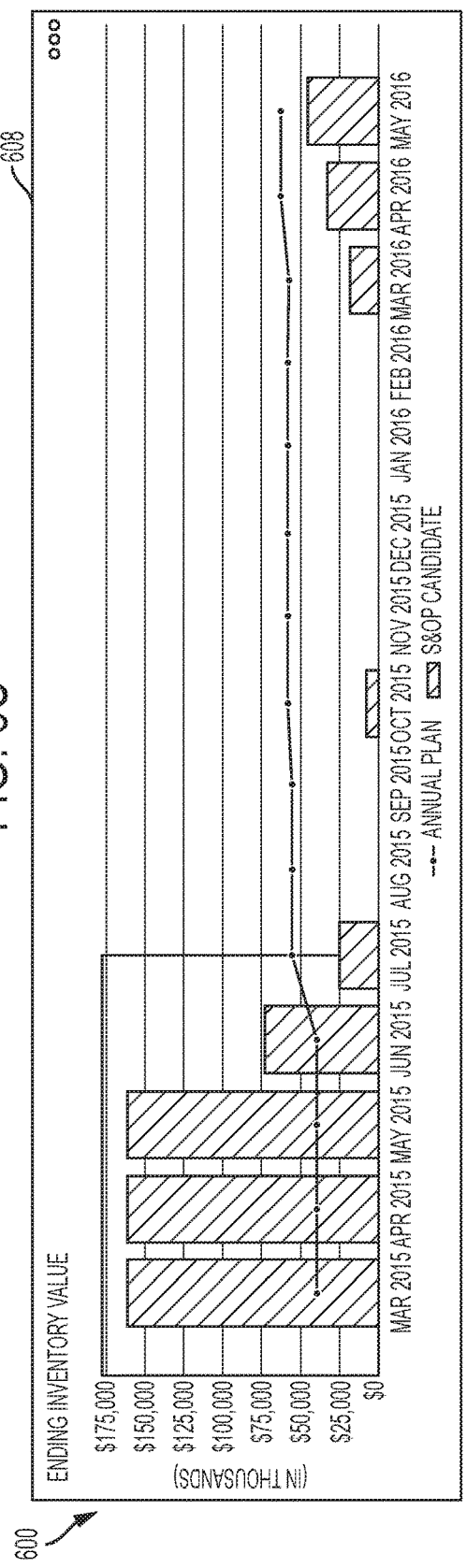
Figure 6E:
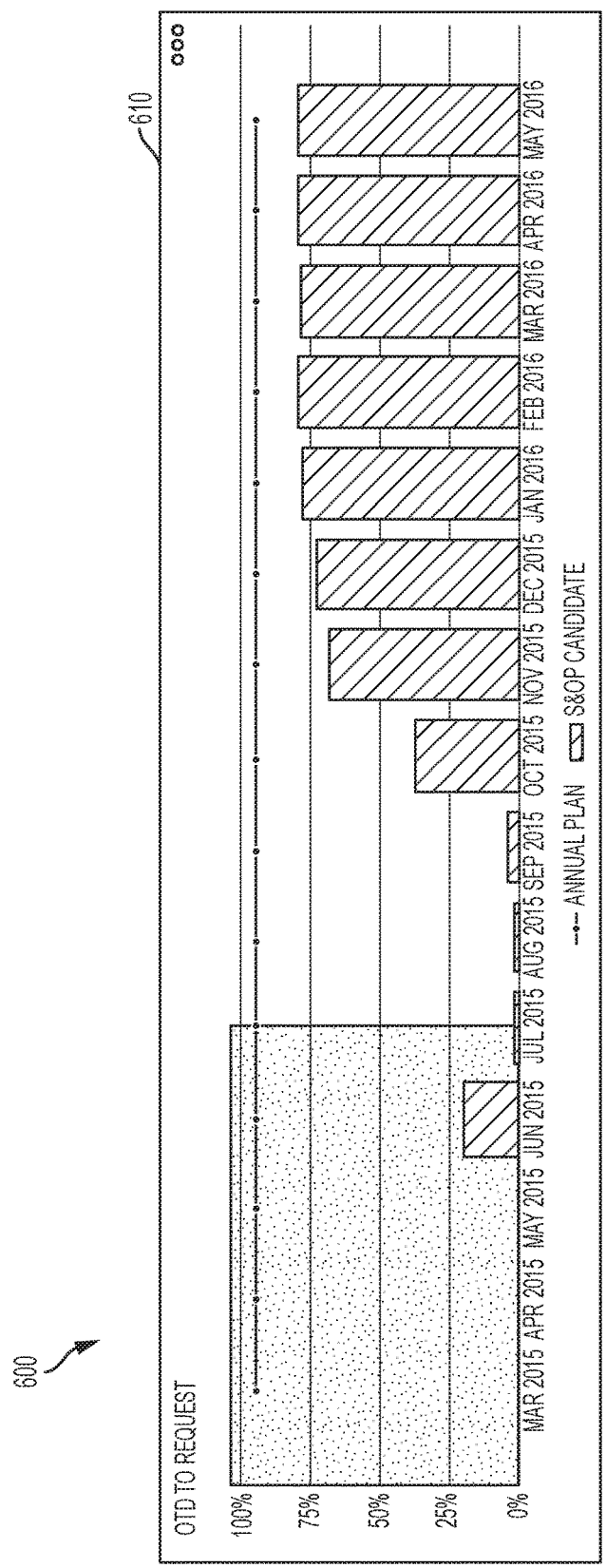

FIGS. 5A-I depict an alternate exemplary format for displaying the data shown in FIG. 3 on a smaller screen, such as a mobile device. The exemplary format shown in FIGS. 5A-I differ from that shown in FIGS. 4A-I in that data is displayed column-by-column, rather than row-by-row. For example, FIG. 5A depicts cells R1C1, R2C1, and R3C1 (i.e., three cells in a column in FIG. 3), as contrasted with FIG. 4A which depicts cells R1C1, R1C2, R1C3, and R1C4 (i.e., four cells in a row in column FIG. 3). Further comparing FIG. 5A with FIG. 4A, column label 404 in FIG. 5A is labeled "C1 Label" as opposed to "R1 Label", and row labels 406a-c are labeled "R1 Label", "R2 Label", and "R3 Label" as opposed to "C1 Label", "C2 Label", and "C3 Label." Breadcrumb trail 402 can operate in a manner similar to the format described in FIGS. 4A-I: it can display at least some of the row and/or column labels that are associated with the cells currently being displayed. In some embodiments, breadcrumb trail 402 in FIGS. 5A-I can differ from breadcrumb trail 402 in FIGS. 4A-I in that some of the content previously displayed in the first line (e.g., row labels) can now be displayed in the second line, and some of the content previously displayed in the second line (e.g., column labels) can now be displayed in the first line. As with FIGS. 4A-I, the user can switch between different cards in each of FIGS. 5A-I by swiping or scrolling left and right, or up and down. In some embodiments, system 100 and/or system 200 can enable a user, system administrator, or content developer to switch easily between the format described in FIGS. 4A-I and the format described in FIGS. 5A-I by toggling a setting.

The formats described above with regards to FIGS. 4A-I and FIGS. 5A-I embody general rules that can be used to convert spreadsheets viewed on large displays (such as worksheet 300 in FIG. 3) into formats that can be easily consumed on small displays. These rules can be extended to other spreadsheets recording a wide variety of data, an arbitrary number of columns, arbitrary number of rows, and an arbitrary number of levels of row and column aggregations. In general, formats for viewing spreadsheets on a small display can focus on depicting a small set of rows or columns at a time. A breadcrumb trail can provide, in a compact fashion, identification data to orient a user regarding the row and column labels that apply to all of the depicted cells.

FIG. 6 depicts an exemplary dashboard 600 that can be displayed by system 100 and/or 200 on a large display, such as on client device 108a, according to some embodiments. Dashboard 600 can comprise multiple sub-displays 602, 604, 606, 608 and 610, wherein each sub-display can comprise a graphical or textual display of some data. In the exemplary case depicted in FIG. 6, each of sub-displays 602, 604, 606, 608 and 610 comprise bar charts showing enterprise revenue, margin (in percent), key constraint utilization, ending inventory value, and On-Time Delivery (OTD) to Request ratio (in percent), respectively. Dashboard 600 can be defined by formatting instructions, such as pre-authored, resource-specific layouts defined in presentation definition module 204, that govern the appearance of each sub-display. For example, these formatting instructions can comprise rules governing the type of chart on display (e.g., bar chart, pie chart, line graph, histogram, etc.), the color scheme of each chart, the font and font size associated with each label, etc. Dashboard 600 can also be defined by layout instructions that govern the organization and size of each sub-display relative to each other. For instance, these layout instructions can specify that each sub-display be organized according to a grid pattern with a plurality of rows and columns. Each sub-display can span one or more rows and one or more columns. In the example shown in FIG. 6, the sub-displays are organized according to a grid pattern having three rows (wherein the first row is at the top of the page, and the third row is at the bottom) and two columns (wherein the first column is at the left of the page, and the second column is at the right). Sub-display 602 is depicted as spanning the first row, and both the first and second columns. Similarly, sub-display 604 spans the second row and the first column; sub-display 606 spans the second row and the second column; sub-display 608 spans the third row and the first column; and sub-display 610 spans the third row and the second column. Other ways of organizing sub-displays are also possible.

In some embodiments, system 100 and/or 200 can resize dashboard 600 depending on the dimensions of a viewport or display for viewing the requested resource. For instance, the grid pattern in dashboard 600 can be resized so that a certain number of rows and/or columns (e.g., three rows and two columns) can span the entire available width and height of a display for viewing the requested resource. In other embodiments, the number of rows and/or columns displayed in dashboard 600 can vary depending on the size of the available display. If a display expands beyond a certain point, for instance, the number of rows and/or columns displayed in dashboard 600 can increase. If a user resizes a window viewing dashboard 600, but the resized window remains a large-screen display, system 100 and/or 200 can also automatically adjust dashboard 600 according to the dimensions of the newly resized viewport by, for example, resizing individual sub-displays to better fit within the newly resized viewport, or by altering the number of rows and/or columns displayed.

Figure 7B:
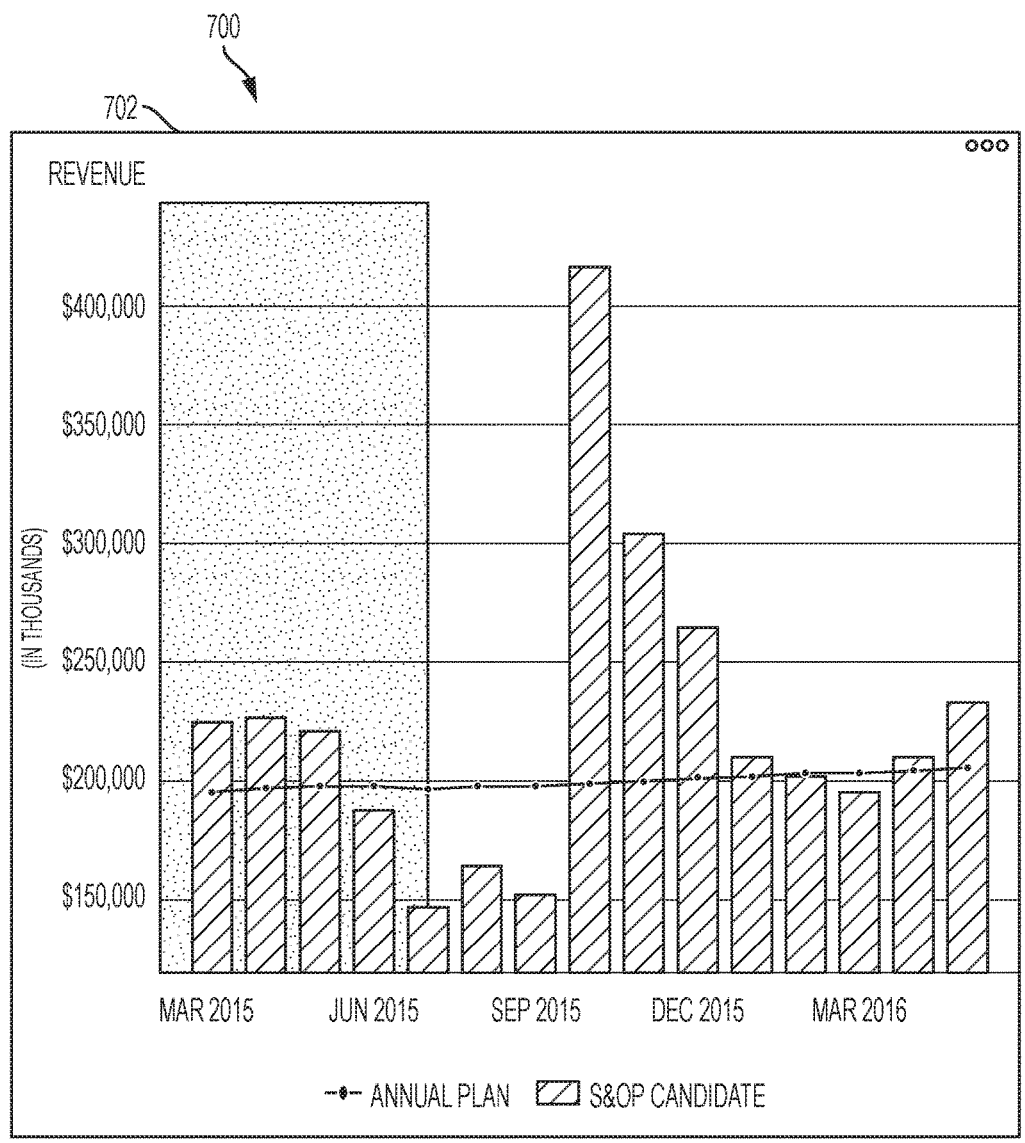
Figure 7C:
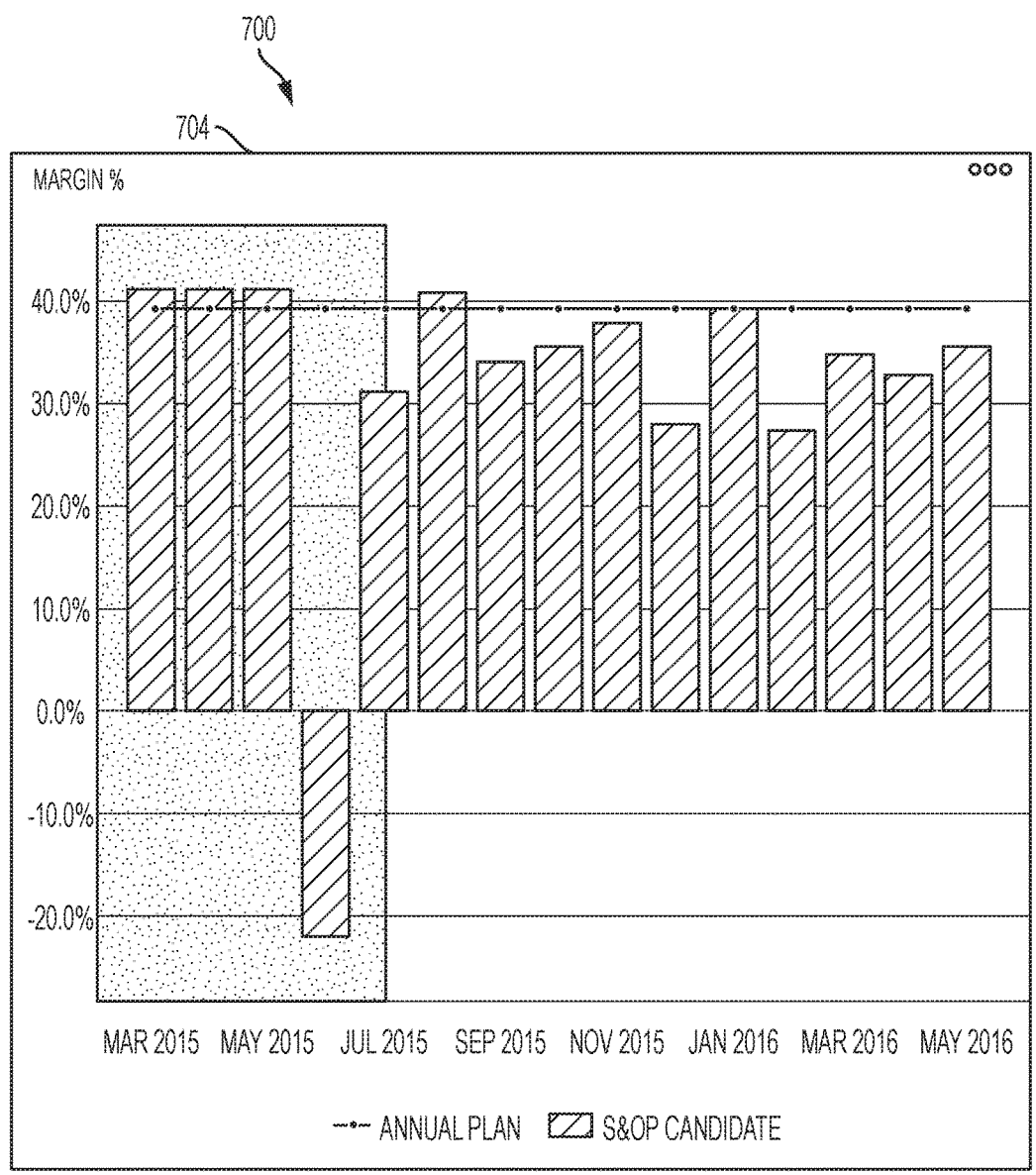

FIGS. 7A-C depict an exemplary format 700 for displaying dashboard 600 on a small screen, such as on client device 108b or on a small window on client device 108a, according to some embodiments. In transforming dashboard 600 from a large-screen view to a small-screen format, the system 100 and/or 200 can be configured to modify layout instructions, e.g., instructions defined in presentation definition module 204, according to preset rules stored in rule set 206. For example, system 100 and/or 200 can render each sub-display 602, 604, 606, 608, and 610 one above the other in a long, narrow column. FIG. 7A illustrates sub-displays 702 and 704, which correspond to sub-displays 602 and 604 respectively, stacked on top of one another—although not shown, further sub-displays corresponding to sub-displays 606, 608, and 610 can be similarly rendered below sub-display 704. The order in which sub-displays are stacked can depend on their original organization in the large-screen format, and on a pre-determined set of rules. For instance, universal formatting rules associated with exemplary format 700 can display sub-displays according to their organization in the large-screen format from left-to-right, and from top-to-bottom. In other words, exemplary format 700 can display the sub-display at row 1, column 1 first, then the sub-display at row 1, column 2, then at row 1, column 3, and so on until there are no more sub-displays to display in row 1. Exemplary format 700 can then display the sub-display at row 2, column 1, then the sub-display at row 2, column 2, then at row 2, column 3, and so on until there are no more sub-displays to display in row 2. Exemplary format 700 can continue to examine and display sub-displays in each row until there are no more rows of sub-displays to display. In the example depicted in FIGS. 6 and 7A, this would result in displaying sub-displays in the following order: 602, 604, 606, 608, and 610. Other kinds of formatting rules are also possible, such as rules that display sub-displays from top-to-bottom, and then left-to-right, or from bottom-to-top, and from right-to-left.

In addition to determining the order in which sub-displays are to be displayed, formatting rules associated with a small-display format can also change the dimensions of each sub-display. For example, sub-display can be re-sized based on the available dimensions of the screen display. FIG. 7B depicts an exemplary, zoomed-in view of sub-display 702, while FIG. 7C depicts a zoomed-in view of sub-display 704. Each of sub-displays 702 and 704 can be sized so that their width and height equal, or are based on, an available screen width and height. If the user centers one of sub-displays 702 and 704 on the screen, the sub-display would occupy the entire screen. If the user re-sizes the small screen, such as by changing the dimensions of a viewport, but does not change the screen size so much that it becomes a large screen, the formatting rules associated with the small-screen display can resize each sub-display so that it again fits the newly resized screen or viewport.

The formatting rules associated with this small-screen format can also cause system 100 and/or 200 to ignore any margin, border, or padding in each sub-display so there can be more room to display data. System 100 and/or 200 can continue to respect certain formatting instructions (e.g., type of chart, font color, line color, background color, etc.) that do not interfere with repositioning and re-sizing sub-displays for display on a small screen.

FIG. 8 depicts an exemplary scorecard 800 that can be displayed by system 100 on a large display, such as on client device 108a, according to some embodiments. Scorecard 800 can comprise a metric column 801, which further comprises a set of metrics. In the example depicted in FIG. 8, these metrics can include a revenue metric 802a, a margin metric 802b, a key constraint utilization metric 802c, an ending inventory metric 802d, and an On Time to Request metric 802e. Scorecard 800 can further comprise a weight column 803. Weight column 803 can comprise the relative weights of each metric used in calculating an overall score 812. In the example depicted in FIG. 8, these metrics can include a weight 804a associated with revenue metric 802a, a weight 804b associated with margin metric 802b, a weight 804c associated with key constraint utilization metric 802c, a weight 804d associated with ending inventory metric 802d, and a weight 804e associated with on time to request metric 802e.

Scorecard 800 can also comprise one or more data columns. In the example depicted in FIG. 8, scorecard 800 comprises two data columns: an annual plan column 805 and an enterprise data column 807. In this example, annual plan column can include previously projected values for each metric, including data 806a-e. Enterprise data column 807 can include actual observed values for each metric, including data 808a-e. Scorecard 800 can also include an overall score label 810, which serves to label the overall score 812 providing an overall measure summarizing scorecard 800. Scorecard 800 can be modified to summarize an arbitrary number or type of data, including any type of performance or status metric or indicator. For instance, scorecard 800 can be modified by deleting, adding, or substituting different types of metrics; or by deleting, adding, or substituting different types of weights. Scorecard 800 can also be modified by deleting, adding or substituting different types of data columns, such as by deleting, adding, or substituting different columns in place of annual plan column 805 and enterprise data column 807. Scorecard 800 can also be modified by adding, deleting, or substituting different types of overall scores.

FIGS. 9A-9B depict exemplary formats 900a and 900b for displaying scorecard 800 on a small display, such as on client device 108b or on a small window on client device 108a, according to some embodiments. In FIG. 9A, exemplary format 900a can include a separate section for each data column. Continuing the example depicted in FIG. 8, exemplary format 900a can include a first data section 905 corresponding to annual plan column 805, and a second data section 907 corresponding to enterprise data column 807. Each data section 905, 907 can include line items for each metric; for instance, data section 905 can include labels 902aa, 902ab, 902ac, 902ad, and 902ae, corresponding to metrics 802a, 802b, 802c, 802d, and 802e respectively. Data section 905 can also include data 906a-e corresponding to data in annual plan column 805, i.e., data 806a-e. Exemplary format 900a can be generalized to an arbitrary number of data columns and an arbitrary number of metrics. Each data column can be organized as a separate data section, and each metric can be given a separate line item within each separate data section.

In FIG. 9B, exemplary format 900b differs from exemplary format 900a in that instead of a separate section for each data column, format 900b includes a separate section for each metric, with a line item within each metric section for each data column. Continuing the example depicted in FIG. 8, exemplary format 900b can include a first metric section 902a, corresponding to revenue metric 802a; a second metric section 902b, corresponding to margin metric 802b; and a third metric section 902c, corresponding to key constraint utilization metric 802c. Although not shown, exemplary format 900b can also include fourth, and fifth metric sections corresponding to ending inventory metric 802d and on time to request metric 802e. Each metric section can include a weight 904a-c, corresponding to weights 804a-c. Each metric section 902a-c can also include separate line items for each data column. Continuing the example depicted in FIG. 8, metric section 902a can include a line for annual plan 905a, corresponding to annual plan column 805, and a line for enterprise data 907a, corresponding to enterprise data column 807. The data provided for each line can also be drawn from FIG. 8: data 906a corresponds to data 806a, whereas data 908a corresponds to data 808a in FIG. 8. Exemplary format 900b can also include an overall score 910 and a percentage 912, which corresponds to overall score label 810 and percentage 812 in FIG. 8. Exemplary format 900b can be generalized to an arbitrary number of data columns and an arbitrary number of metrics. Each metric can be organized as a separate metric section, and each data column can be given a separate line within each separate metric section. In some embodiments, system 100 can enable a user, system administrator, or content developer to switch easily between format 900a and format 900b by toggling a setting.

Figure 10:
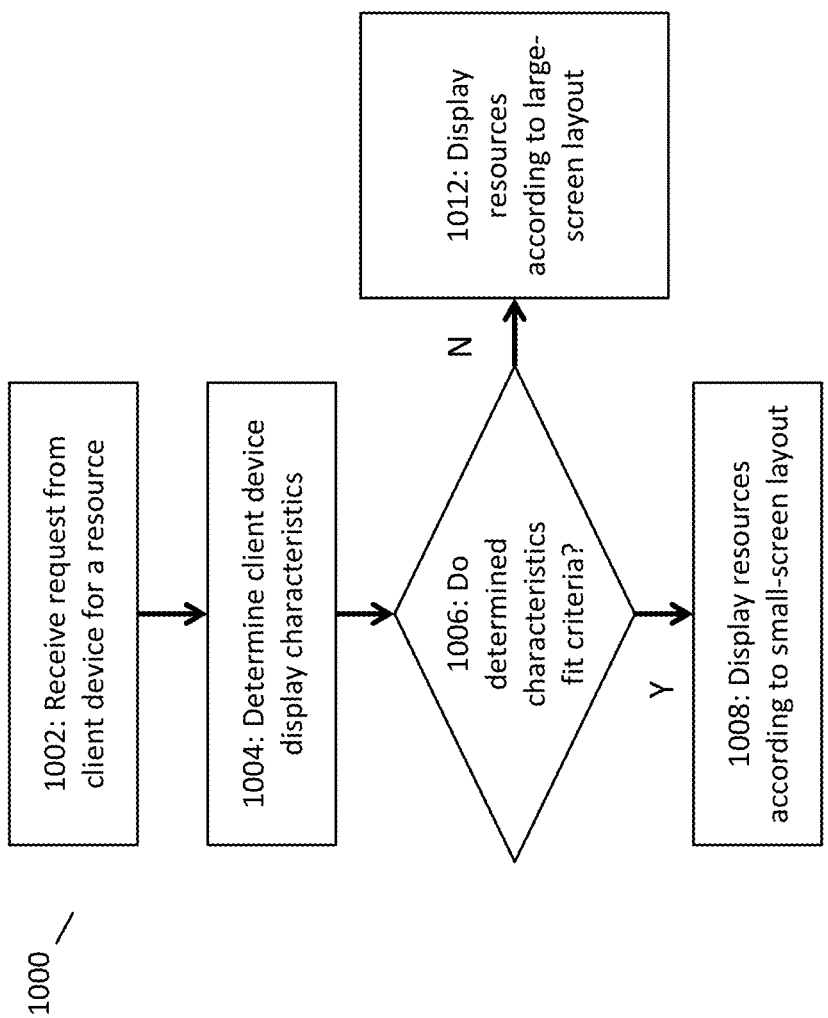
FIG. 10 depicts an exemplary process for adjusting the layout of a resource requested by a client device, according to some embodiments.

FIG. 10 depicts a process 1000 for adjusting the layout of a resource requested by a client device, according to some embodiments. At step 1002, a device implementing process 1000 (e.g., database server 102) can receive a request from a client device (e.g., client device 108a or 108b) for a particular resource. A requested resource can be a spreadsheet of data, a dashboard of graphs and/or charts, and/or a scorecard of metrics, as discussed above. Other types of requested resources are also possible.

At step 1004, process 1000 can determine the client device's display characteristics. In some embodiments, this determination can be implemented using CSS media queries, and can include determining a width, height, and/or size of a physical screen associated with a client device, a width, height, and/or size of a window or viewport being displayed on the client device, an orientation of the display (e.g., landscape vs. portrait), a resolution, a supported color scheme, as well as other parameters pertaining to a display. In some cases, the request for a resource received at step 1002 can include the client device's display characteristics, in which case no separate query and response is required.

At step 1006, process 1000 can determine if the determined client device display characteristics meet certain pre-determined criteria. In some embodiments, this step can comprise comparing a width, height, and/or size of a window or viewport being displayed on the client device against a size threshold. The pre-determined criteria can be set by a system administrator or by the user. The pre-determined criteria can also vary depending on the type of resource being requested in step 1002—for example, size thresholds can be set higher for spreadsheet type resources, and set lower for dashboard or scorecard type resources, or vice versa. If the determined client device display characteristics do not meet the pre-determined criteria (e.g., the width, height, and/or size of a window or viewport being displayed is greater than a certain size threshold), process 1000 can branch to step 1012, which causes system 100 and/or 200 to display the requested resource according to its normal, large-screen layout defined in presentation definition module 204. If the determined client device display characteristics do meet the pre-determined criteria (e.g., the width, height, and/or size of a window or viewport is less than a certain size threshold), process 1000 can branch to step 1008. At step 1008, process 1000 can cause system 100 and/or 200 to display the requested resource according to a small-screen layout by applying rules from rule set 206.

Figure 11:
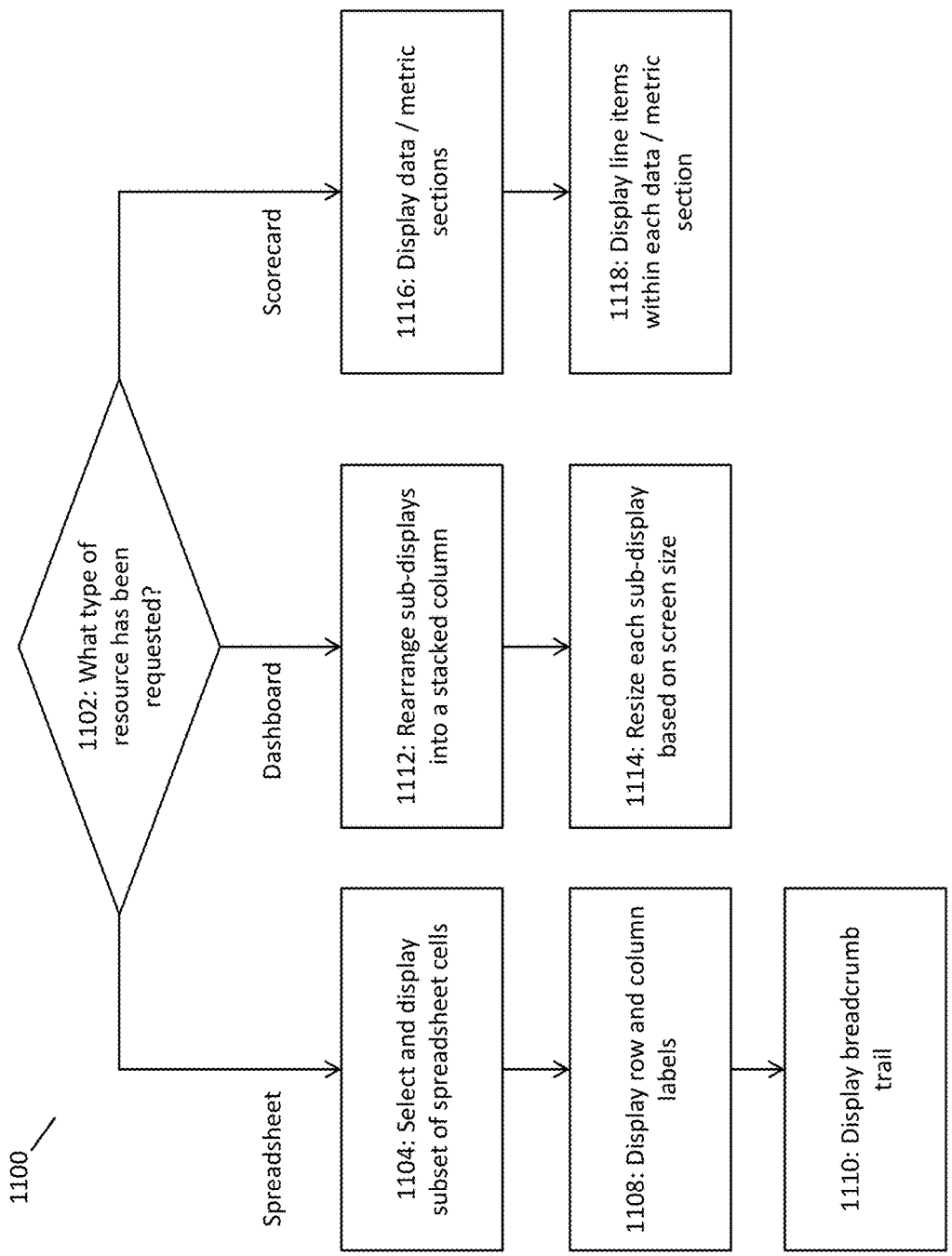
FIG. 11 depicts an exemplary process for determining a revised layout for a requested resource, according to some embodiments.

FIG. 11 depicts a process 1100 illustrating step 1008 in greater detail, according to some embodiments. At step 1102, process 1100 can determine what type of resource has been requested. If a spreadsheet type resource (such as one depicted in FIG. 3) has been requested, process 1100 can branch to step 1104. If a dashboard type resource (such as one depicted in FIG. 6) has been requested, process 1100 can branch to step 1112. If a scorecard type resource (such as one depicted in FIG. 8) has been requested, process 1100 can branch to step 1116. Other types of resources can be accommodated as well.

Step 1104 is the first step for displaying a small-display layout for a spreadsheet-type resource. At step 1104, process 1100 can select and display a subset of spreadsheet cells. The selection of the subset of cells can be a configurable parameter pre-set by a system administrator, system designer, or by a user. In some embodiments, process 1100 can select a single row (e.g., the first row), or a subset of a single row (e.g., the first three cells of the first row) to display. In other embodiments, process 1100 can select a single column (e.g., the first column), or a subset of a single column (e.g., the first four cells of the first column which have the same breadcrumb trail) to display. In yet other embodiments, process 1100 can select two or more rows/columns, or a subset of two or more rows/columns, to display. Process 1100 can be configured to ignore empty rows and empty columns when determining what cells to display.

At step 1108, process 1100 can display row and column labels that correspond to the selected and displayed subset of cells. In FIGS. 4A-I and 5A-I, this step corresponds to displaying the appropriate row and cell headings for column label 404 and row labels 406*a-c*.

At step 1110, process 1100 can display the breadcrumb trail that corresponds to the selected subset of cells to display. In FIGS. 4A-I and 5A-I, this step corresponds to determining and displaying the appropriate text for breadcrumb trail 402. As discussed above, breadcrumb trail 402 can show at least some of the row and/or column labels that are associated with the cells currently being displayed.

Step 1112 is the first step for displaying a small-display layout for a dashboard-type resource. At step 1112, process 1100 can arrange sub-displays into a stacked column. This step can comprise ignoring certain pre-authored layout instructions (e.g., formatting that concerns borders and padding), and determining the correct order in which sub-displays should be stacked. As described above, the determination of the correct order can comprise applying a set of general rules, such as putting sub-displays that are higher on the page higher on the stacked column, and putting sub-displays that are to the left of the page higher than sub-displays that are to the right of the page. The correct order can also be determined by prioritizing sub-displays that are larger in size, or that display more important metrics or data.

At step 1114, process 1100 can resize each sub-display based on the determined display size of the client device. In some embodiments, each sub-display can be resized so that they are the same size as the determined screen size of the client device. This can be useful for maximizing the limited screen size of a mobile client device. In other embodiments, each sub-display can be resized so that they are smaller than the determined screen size of the client device by a pre-defined margin.

Step 1116 is the first step for determining a revised, small-display layout for a scorecard-type resource. At step 1116, process 1100 can determine whether to display data sections (e.g., using exemplary format 900*a* in FIG. 9A) or to display metric sections (e.g., using exemplary format 900*b* in FIG. 9B). The selection of data sections vs. metric sections can be a configurable parameter that can be set by a system administrator, a content developer, or a user. In some cases, process 1100 can also determine whether to display data sections vs. metric sections based on the number of data columns and number of metrics. If, for instance, there are many metrics but a relatively small number of data columns, process 1100 can determine to display data sections instead of metric sections. In this step, process 1100 can determine to display a data section for each data column, or process 1100 can determine to display a metric section for each separate metric.

At step 1118, process 1100 can determine the line items within each data/metric section to display. This step corresponds to determining which metrics to display within data section 905 and 907 in FIG. 9A, and determining which data lines to display within metric sections 902*a*, 902*b*, and 902*c* in FIG. 9B.

Processes 1000 and 1100 in FIGS. 10 and 11 can be performed by a variety of devices. For example, some or all of processes 1000 and 1100 can be performed by one or more processors at or associated with database server 102 (e.g., processor 115). With appropriate modification, some or all of processes 1000 and 1100 can also be performed by one or more processors at a client device, such as client device 108*a* and 108*b*. Furthermore, again with appropriate modification, some or all of processes 1000 and 1100 can be performed by an intermediate device located between database server 102 and client device 108*a-b*, such as a web server, router, node, switch, or other communication interface. Processes 1000 and 1100 can also be modified by re-ordering, adding, deleting, or modifying any of the steps discussed above. While process 1100 focuses on three types of requested resources (spreadsheets, dashboards, and scorecards), process 1100 can also be modified to accommodate other types of requested resources.

Figure 12:
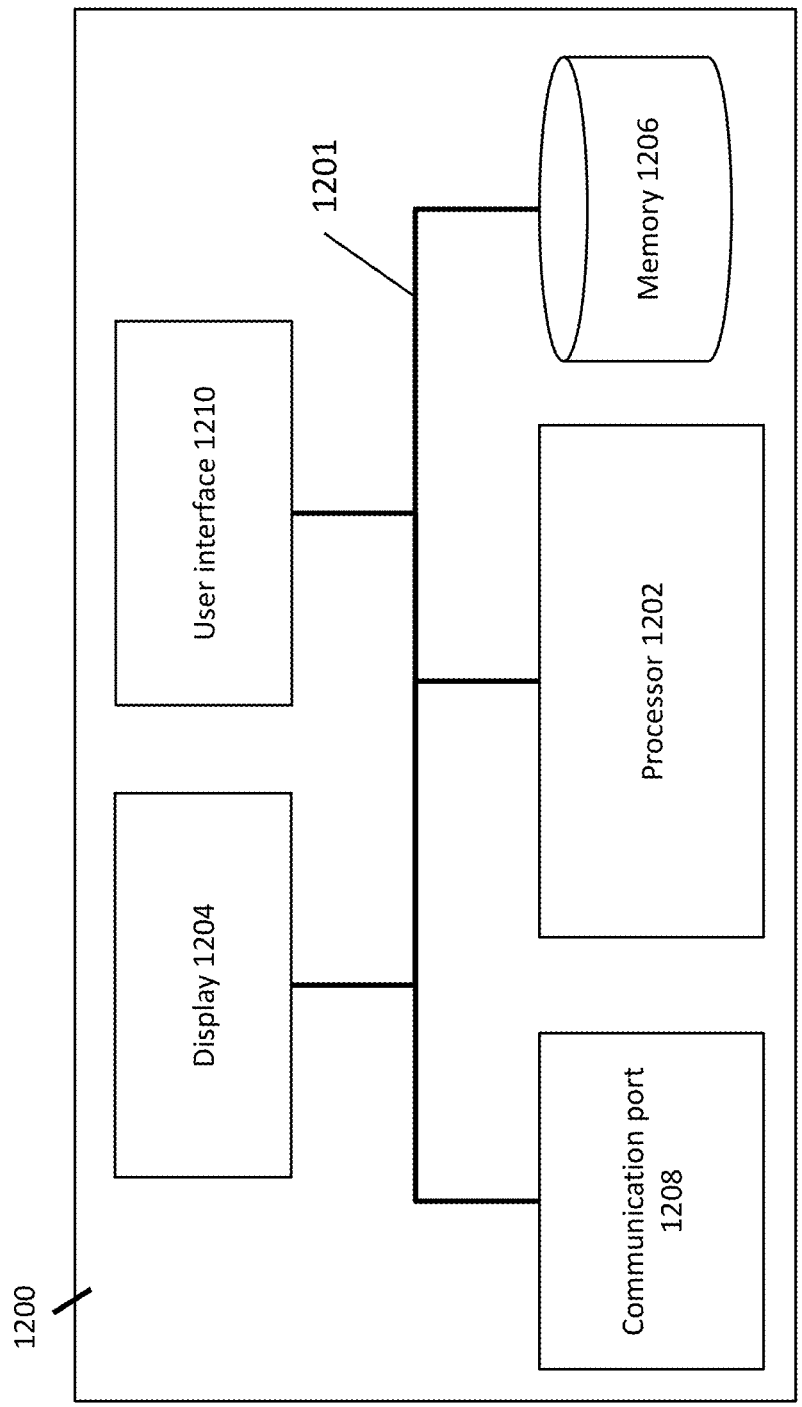
FIG. 12 depicts a computing device or computer system, according to some embodiments.

FIG. 12 depicts an example of a computer system 1200 with which embodiments of the present invention can be implemented. Client devices 108*a*, 108*b*, and/or data server 102 can be implemented according to parts or all of the computer system 1200. According to the present example, the computer system can include a bus 1201, at least one processor 1202, at least one communication port 1208, a memory 1206, a display 1204, and a user interface 1210.

Processor(s) 1202 can include any known processor, such as but not limited to, an Intel® Itanium® or Itanium 2® processor(s), AMD® Opteron® or Athlon MP® processor(s), Motorola® lines of processors, Apple® A7®, A8®, A9® lines of processors, or Qualcomm® lines of processors. Communication port(s) 1208 can be any communication interface used for communicating with another device, such as an RS-232 port for use with a modem based dial-up connection, a 10/100 Ethernet port, a Bluetooth® or WiFi interface, a Gigabit port using copper or fiber, or a 3GPP, LTE, or other wireless cellular network-based interface. Communication port(s) 1208 can enable computer system 1200 to communicate over a network such as a Local Area Network (LAN), Wide Area Network (WAN), or any network to which computer system 1200 connects. Memory 1206 can comprise Random Access Memory (RAM) or any other dynamic storage device(s) commonly known to one of ordinary skill in the art. Memory can also comprise Read Only Memory (ROM) that can include any static storage device(s) such as Programmable Read Only Memory (PROM) chips for storing static information such as instructions for processor 1202, for example. Furthermore, memory 1206 can also comprise mass storage memory for storing information and instructions. For example, hard disks such as the Adaptec® family of SCSI drives, an optical disc, an array of disks such as RAID (e.g., the Adaptec family of RAID drives), or any other mass storage devices may be used. Bus 1201 can be a PCI/PCI-X or SCSI based system bus depending on the storage devices used, for example.

Display 1204 can include any known device for displaying data in a visual format, including screens or displays integrated into computer system 1200, as well as screens, displays or monitors that communicate but are not integrated with computer system 1200. User-interface 1210 can include any known device for receiving user input, including keyboards, microphones, optical or trackball mouse, joysticks, trackballs, gesture recognition devices, etc. In some embodiments, user-interface 1210 can be integrated with display 1204, as in the case of a responsive touchscreen. In other embodiments, user-interface 1210 can be a separate device that is integrated with computer system 1210 (e.g., a built-in physical keyboard, as in the case of a laptop) or that communicate but are not integrated with computer system 1210. The components described are meant to exemplify some types of possibilities. In no way should the aforementioned examples limit the scope of the invention, as they are only exemplary embodiments of computer system 1210 and related components.

The invention claimed is:

1. A computer system comprising:
at least one memory configured to store:
(i) a plurality of resources, each resource being of a specific type; and each resource being associated with a different, pre-authored resource-specific format applied to a canvas of the resource and to content within the canvas; and
(ii) a formatting rule associated with each resource type; each canvas; the content within each canvas; and a display; and
at least one processor configured to:
receive a request for a resource of the plurality of resources to be displayed within the display;
determine a parameter associated with the display for displaying the canvas and the content of the requested resource;
compare the parameter to a pre-determined criteria;
when the parameter does not meet the pre-determined criteria, display the requested resource according to the pre-authored resource-specific format associated with the requested resource;
when the parameter does meet the pre-determined criteria, dynamically adjust the pre-authored resource-specific format based on the formatting rule to generate a dynamically adjusted format of the canvas and a dynamically adjusted format of the content of the requested resource; and
display the requested resource on the display according to the dynamically adjusted format of the canvas and the dynamically adjusted format of the content.

2. The computer system of claim 1, wherein the resource type is rich text, web view, an image, a chart, a spreadsheet, or a video.

3. The computer system of claim 1, wherein:
each resource of the plurality of resources is a spreadsheet having content that comprises a plurality of cells arranged in a plurality of rows and a plurality of columns, wherein each cell is associated with a row having one or more row labels and with a column having one or more column labels; and
the formatting rule is used to:
generate the dynamically adjusted format of the canvas and the dynamically adjusted format of the content by (i) selecting a subset of the plurality of cells, and (ii) generating a breadcrumb trail comprising at least part of a set of labels comprising row labels of rows associated with cells in the subset of cells and column labels of columns associated with cells in the subset of cells, and
display the requested resource according to the dynamically adjusted format of the canvas and the dynamically adjusted format of the content by displaying a first card comprising the selected subset of cells and the generated breadcrumb trail.

4. The computer system of claim 3, wherein the breadcrumb trail comprises only row labels and column labels associated with every cell in the subset of cells.

5. The computer system of claim 3, wherein at least one of the row labels and the column labels are organized according to a nested hierarchy having two or more levels.

6. The computer system of claim 3, wherein the at least one processor is further configured to:
receive user input directing the computer system to navigate in at least one of a horizontal direction and a vertical direction; and
display a second card comprising (i) a second subset of the plurality of cells based on the received user input, and (ii) a second breadcrumb trail comprising at least part of a second set of labels comprising row labels of rows associated with cells in the second subset of cells and column labels of columns associated with cells in the second subset of cells.

7. The computer system of claim 1, wherein:
each resource of the plurality of resources is a dashboard having content that comprises a plurality of sub-displays; and
the formatting rule is used to:
generate the dynamically adjusted format of the canvas and the dynamically adjusted format of the content by (i) arranging each sub-display into a stacked column, and (ii) resizing each sub-display based on the parameter.

8. The computer system of claim 1, wherein:
each resource of the plurality of resources is a scorecard having content that comprises: a plurality of metrics and at least one data column configured to store data corresponding to each metric of the plurality of metrics; and
the formatting rule is used to:
generate the dynamically adjusted format of the canvas and the dynamically adjusted format of the content by (i) generating a separate data section for each of the at least one data column, and (ii) adding a line item to each separate data section for each metric of the plurality of metrics.

9. The computer system of claim 1, wherein:
each resource of the plurality of resources is a scorecard having content that comprises a plurality of metrics and at least one data column configured to store data corresponding to each metric of the plurality of metrics; and
the formatting rule is used to:
generate the dynamically adjusted format of the canvas and the dynamically adjusted format of the content by (i) generating a separate metric section for each metric of the plurality of metrics, and (ii) adding a line item to each separate metric section for each of the at least one data column.

10. The computer system of claim 1, wherein the parameter comprises at least one of a dimension and a size associated with a physical screen.

11. The computer system of claim 1, wherein the parameter comprises at least one of a dimension and a size associated with a viewport being displayed on a physical screen.

12. A computer system comprising:
at least one memory configured to store:
(i) a plurality of resources, each resource being associated with a different, pre-authored resource-specific format applied to a canvas of the resource and to content within the canvas, and being associated with a resource type of a plurality of resource types, wherein each resource type is associated with two or more resources;
(ii) a plurality of formatting rules, each formatting rule being associated with each resource type, each canvas; the content within each canvas; and a display; and
at least one processor configured to:
receive a request for a resource of the plurality of resources to be displayed within the display,
determine a parameter associated with the display for displaying the canvas and the content of the requested resource;
compare the parameter to a pre-determined criteria;
when the parameter does not meet the pre-determined criteria, display the requested resource according to the pre-authored resource-specific format associated with the requested resource; and
when the parameter does meet the pre-determined criteria:
select a formatting rule of the plurality of formatting rules based on the resource type associated with the requested resource, the content of the resource type, and the parameter;
use the formatting rule to generate a dynamically adjusted format of the canvas and a dynamically adjusted format of the content of the requested resource, and
display the requested resource on the display according to the dynamically adjusted format of the canvas and the dynamically adjusted format of the content.

13. The computer system of claim 12, wherein the plurality of resource types includes a spreadsheet resource type, a dashboard resource type, and a scorecard resource type.

14. A method for displaying resources on different types of displays, the method comprising:
storing, in at least one memory, (i) a plurality of resources, each resource being associated with a different, pre-authored resource-specific format applied to a canvas of the resource and to content within the canvass; and each resource being of a specific type; and (ii) a formatting rule associated with: each resource type; each canvas; the content within each canvas; and a display;
receiving, by at least one processor, a request for a resource of the plurality of resources to be displayed within the display;
determining, by the at least one processor, a parameter associated with a display for displaying the canvas and content of the requested resource;
comparing, by the at least one processor, the parameter to a pre-determined criteria;
when the parameter does not meet the pre-determined criteria, displaying the requested resource according to the pre-authored resource-specific format associated with the requested resource; and when the parameter does meet the pre-determined criteria, dynamically adjusting the pre-authored resource-specific format based on the formatting rule to generate a dynamically adjusted format of the canvas and a dynamicslly adjusted format of the content of the requested resource; and
displaying the requested resource on the display according to the dynamically adjusted format of the canvas and the dynamically adjusted format of the content.

15. The method of claim 14, wherein:
each resource of the plurality of resources is a spreadsheet having content that comprises a plurality of cells arranged in a plurality of rows and a plurality of columns, wherein each cell is associated with a row having one or more row labels and with a column having one or more column labels; and
using the formatting rule to generate the dynamically adjusted format of the canvas and the dynamically adjusted format of the content comprises:
(i) selecting a subset of the plurality of cells, and
(ii) generating a breadcrumb trail comprising at least part of a set of labels comprising row labels of rows associated with cells in the subset of cells and column labels of columns associated with cells in the subset of cells; and
displaying the requested resource according to the dynamically adjusted format of the canvas and the dynamically adjusted format of the content comprises displaying a first card comprising the selected subset of cells and the generated breadcrumb trail.

16. The method of claim 15, wherein the breadcrumb trail comprises only row labels and column labels associated with every cell in the subset of cells.

17. The method of claim 15, wherein at least one of the row labels and the column labels are organized according to a nested hierarchy having two or more levels.

18. The method of claim 15, further comprising:
receiving user input directing the at least one processor to navigate in at least one of a horizontal direction and a vertical direction;
displaying a second card comprising (i) a second subset of the plurality of cells based on the received user input, and (ii) a second breadcrumb trail comprising at least part of a second set of labels comprising row labels of rows associated with cells in the second subset of cells and column labels of columns associated with cells in the second subset of cells.

19. The method of claim 14, wherein:
each resource of the plurality of resources is a dashboard having content that comprises a plurality of sub-displays; and
using the formatting rule to generate the dynamically adjusted format of the canvas and the dymamically adjusted format of the content comprises:
(i) arranging each sub-display into a stacked column, and
(ii) resizing each sub-display based on the parameter.

20. The method of claim 14, wherein:
each resource of the plurality of resources is a scorecard having content that comprises a plurality of metrics, and at least one data column configured to store data corresponding to each metric of the plurality of metrics; and
using the formatting rule to generate the dynamically adjusted format of the canvas and the dynamically adjusted format of the content comprises:

(i) generating a separate data section for each of the at least one data column, and (ii) adding a line item to each separate data section for each metric of the plurality of metrics.

21. The method of claim 14, wherein:

each resource of the plurality of resources is a scorecard having content that comprises a plurality of metrics, and at least one data column configured to store data corresponding to each metric of the plurality of metrics; and using the formatting rule to generate the dynamically adjusted format of the canvas and the dynaically adjusted format of the content comprises:

(i) generating a separate metric section for each metric of the plurality of metrics, and (ii) adding a line item to each separate metric section for each of the at least one data column.

22. The method of claim 14, wherein the parameter comprises at least one of a dimension and a size associated with a physical screen.

23. The method of claim 14, wherein the parameter comprises at least one of a dimension and a size associated with a viewport being displayed on a physical screen.

* * * * *